(12) United States Patent
Valenza et al.

(10) Patent No.: US 11,657,583 B2
(45) Date of Patent: May 23, 2023

(54) AUGMENTED REALITY WIRELESS PLANNING AND TROUBLESHOOTING

(71) Applicant: Cisco Technology, Inc., San Jose, CA (US)

(72) Inventors: Salvatore Valenza, Pomy (CH); Taha Hajar, Chavannes-Renens (CH); Samer Salam, Beirut (LB); Mathieu Bastien Monney, Bussigny (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/818,094

(22) Filed: Aug. 8, 2022

(65) Prior Publication Data

US 2023/0031317 A1   Feb. 2, 2023

Related U.S. Application Data

(63) Continuation of application No. 17/390,692, filed on Jul. 30, 2021, now Pat. No. 11,410,399.

(51) Int. Cl.
| | |
|---|---|
| *G06T 19/00* | (2011.01) |
| *G06T 15/10* | (2011.01) |
| *G06T 15/08* | (2011.01) |
| *H04B 17/391* | (2015.01) |
| *H04W 16/20* | (2009.01) |

(Continued)

(52) U.S. Cl.
CPC ............ *G06T 19/006* (2013.01); *G06F 30/18* (2020.01); *G06K 7/0095* (2013.01); *G06T 15/08* (2013.01); *G06T 15/10* (2013.01); *H04B 17/391* (2015.01); *H04W 16/18* (2013.01); *H04W 16/20* (2013.01); *G06T 2219/016* (2013.01)

(58) Field of Classification Search
None
See application file for complete search history.

(56) References Cited

U.S. PATENT DOCUMENTS

| | | |
|---|---|---|
| 2014/0055490 A1 | 2/2014 | Mule et al. |
| 2018/0083848 A1 | 3/2018 | Siddiqi et al. |

(Continued)

OTHER PUBLICATIONS

Elechi et al., Path Loss Prediction Mode for GSM Fixed Wireless Access, Jul. 31, 2016, European Journal of Engineering Research and Science, 1-4 (Year: 2016).*

(Continued)

*Primary Examiner* — Robert J Craddock
(74) *Attorney, Agent, or Firm* — Polsinelli

(57) ABSTRACT

The present technology includes calculating the 3-D RF propagation pattern in a space for at least one Wi-Fi access point and displaying a visualization of the RF propagation pattern in augmented reality (AR). The augmented reality view of the space can be created by capturing at least one image of the space and displaying at least one image of the space on a display with the visualization of the Wi-Fi access point RF propagation pattern on the display overlaid at least one image of the space. The disclosed technology further can calculate the RF propagation properties and render a visualization of the RF propagation patterns in a 3D space by utilizing hardware on a user device. The AR display is useful in visualizing, in-person aspects of a Wi-Fi network and coverage, and can be used in troubleshooting, maintenance, and simulations of equipment variations.

20 Claims, 16 Drawing Sheets

(51) Int. Cl.
*G06F 30/18* (2020.01)
*G06K 7/00* (2006.01)
*H04W 16/18* (2009.01)

(56) References Cited

U.S. PATENT DOCUMENTS

2019/0197791 A1  6/2019  Skidmore
2020/0068413 A1  2/2020  Hadley
2020/0286297 A1  9/2020  Edwards

OTHER PUBLICATIONS

Rossi et al., In situ measurement of reflection and diffraction coefficients of UHF radio waves on buildings using a ring array, Dec. 31, 2000, 361-369 (Year: 2000).*
Nguyen et al., "Demo: WiART—Visualize and Interact with Wireless Networks using Augmented Reality", *MobiCom'16*, Oct. 3-7, 2016, New York City, NY, USA, pp. 511-512.

* cited by examiner

AUGMENTED REALITY WIRELESS PLANNING AND TROUBLESHOOTING

CROSS-REFERENCE TO RELATED APPLICATION

The application is a Continuation of, and claims priority to, U.S. patent application Ser. No. 17/390,692 entitled AUGMENTED REALITY WIRELESS PLANNING AND TROUBLESHOOTING, filed on Jul. 30, 2021, the contents of which are herein incorporated by reference in its entirety.

TECHNICAL FIELD

The present technology pertains to a W-Fi visualization tool and more specifically pertains to a Wi-Fi visualization tool that permits visualization of Wi-Fi in augmented reality.

BACKGROUND

Wi-Fi planning in an enterprise environment can be difficult due to the particularities of a particular floor plan, the number of access points required to cover a floor plan, and the distribution of user devices throughout the day, among other challenges. Tools exist to simulate Wi-Fi coverage, but these tools are approximations that are not accurate enough to plan and manage the network with sufficient predictability. In fact, many such tools rely on technicians to walk a floor after deployment of a network to identify areas in which Wi-Fi planning tools are inaccurate.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DESCRIPTION OF EXAMPLE EMBODIMENTS

Figure 1:
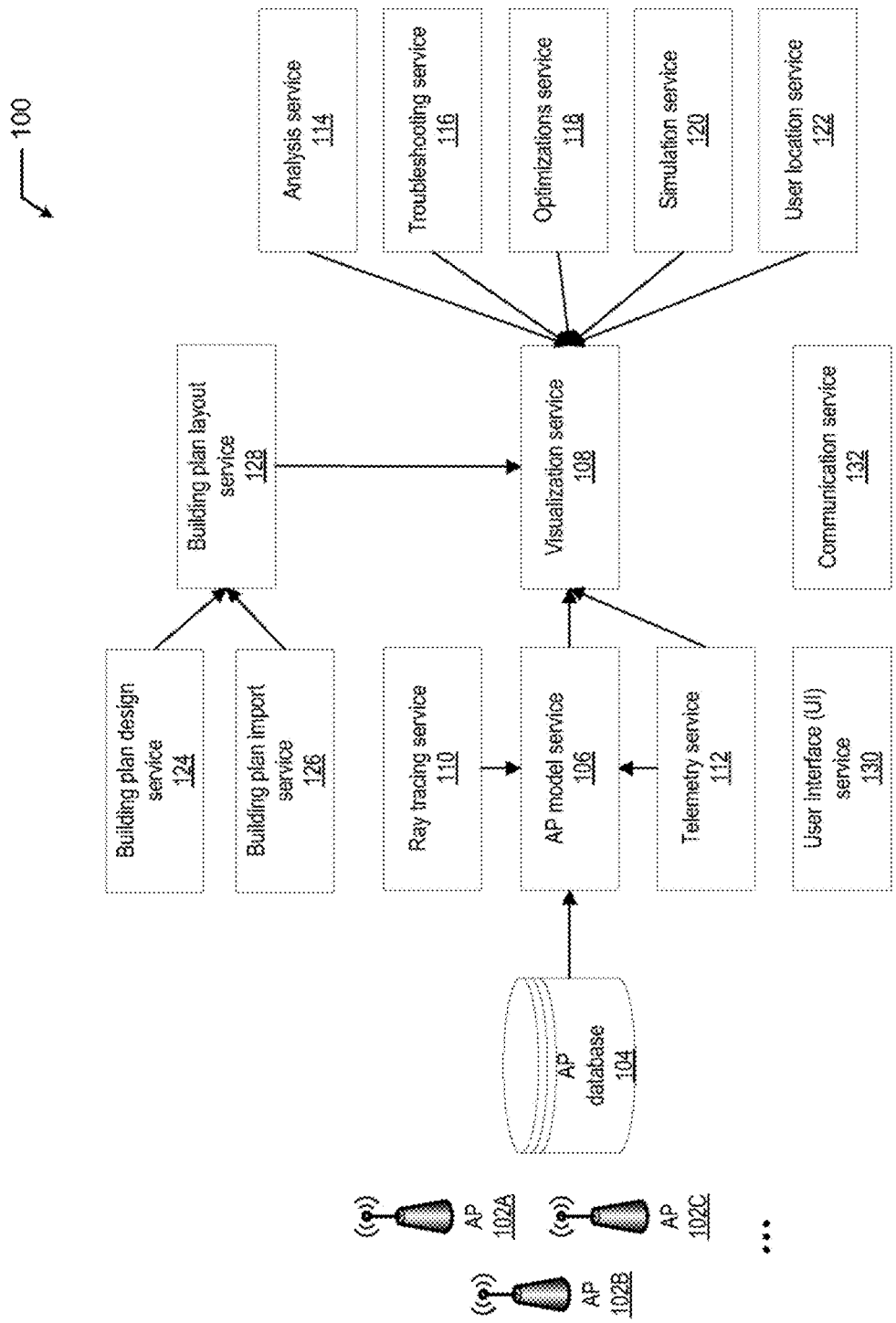
FIG. 1 illustrates an example visualization system for presenting a wireless signal propagation in 3-D according to some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Disclosed are systems, apparatuses, methods, computer-readable medium, and circuits for visualizing a W-Fi access point 3-D RF propagation pattern in Augmented Reality (AR). According to at least one example, the present technology includes calculating the 3-D RF propagation pattern in a space for at least one Wi-Fi access point based on a RF propagation model for the Wi-Fi access point. The location and orientation of a user device relative to at least one Wi-Fi access point in the space can be determined. The present technology can be used to present a visualization of the Wi-Fi access point RF propagation pattern overlaid a first-person perspective view of the space based on the location and the orientation of the user device relative to at least one Wi-Fi access point.

In some embodiments, the first-person perspective view of the space is an augmented reality view of the space, which can be created by capturing at least one image of the space and displaying at least one image of the space on a display. The present technology can present the visualization of the Wi-Fi access point RF propagation pattern on the display overlaid at least one image of the space.

In some embodiments, representing the visualization of the Wi-Fi access point propagation can be in a first style at a first location of the user device, and a second style at a second location of the user device.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The disclosed technology addresses the need in the art for a Wi-Fi visualization tool that is accurate in 3-D. Rather than merely calculating an RF propagation pattern at a single standard height and assuming that the RF propagation pattern extends uniformly at all heights, the present technology calculates RF propagation properties and many points in space including all three (X, Y, and Z) dimensions.

The disclosed technology further can calculate the RF propagation properties and render a visualization of the RF propagation patterns in a 3D space by utilizing hardware on a user device.

Collectively these improvements further enable RF propagation visualizations to be overlaid video captured by a user device to provide an augmented reality (AR) display of an RF environment created by Wi-Fi access points. The AR display is useful in visualizing, in-person aspects of a Wi-Fi network and coverage, and can be used in troubleshooting, maintenance, and simulations of equipment variations.

FIG. 1 illustrates an example 3-D signal propagation visualization system 100 for presenting a wireless signal propagation in 3-D according to some aspects of the disclosed technology. As shown in FIG. 1, the 3-D signal propagation visualization system 100 can include one or more services primarily responsible for examining and analyzing signals from a plurality of access points (APs) 102A, 102B, 102C, . . . (collectively, 102), determining a signal propagation pattern for the APs 102 based on a signal propagation model, and providing a 3-D visualization of the signal propagation pattern including analysis, troubleshooting, simulations, or optimizations of the signal propagation pattern.

The 3-D signal propagation visualization system 100 can include an AP database 104 that includes information about the plurality of APs 102, which are configured to transmit wireless communication signals. In some aspects, the information about the plurality of APs 102 can include, but is not limited to a location of APs 102 and their orientation (e.g., azimuth and elevation angles), a model number, a signal strength, end-of-life data, an antenna type, a channel, a frequency (band), or network information of which the APs 102 belong.

The 3-D signal propagation visualization system 100 can include an AP model service 106 that is a collection of signal propagation models for different types of AP antennae 102. In some examples, the signal propagation model includes a description of the signal propagation pattern based on the information associated with the AP antennae 102. For example, such information can be provided by the AP database 104 or related to parameters derived from various configuration attributes and measurements such as transmission power (txPower), signal-to-noise ratio (SNR), Key Performance Indicator (KPI) values, or Received Signal Strength Indication (RSSI) values.

The 3-D signal propagation visualization system 100 can include a visualization service 108 configured to perform 3-D modeling, i.e., display a 3-D visualization of the signal propagation pattern based on the signal propagation model. In some examples, the visualization service 108 can display the 3-D visualization of the signal propagation in the form of a heatmap, which uses color-coding to represent different values of the signal strength. In some instances, the visualization service 108 can generate a time-based (temporal) visualization where changes in the signal propagation pattern over time can be presented in the 3-D visualization.

The 3-D signal propagation visualization system 100 can also include a ray tracing service 110 configured to perform ray tracing from a particular AP. In some examples, the ray-tracing service 110 can compute attenuation based on the line-of-sight from a particular AP to a certain vertex in space. For example, ray tracing can be used to visualize the signal propagation by tracing paths of electromagnetic waves and simulating the way that the waves interact with any objects it may hit. If a straight line is drawn from a particular AP and does not hit anything in the space, then the signal propagation model works in a straightforward manner. On the other hand, if there is an obstacle (e.g., a wall, shelving, ceiling, etc.) along the path, the signal propagation pattern can be broken into multiple segments since the signal propagation pattern can change depending on the properties of the obstacle that the pattern has to pass through.

The 3-D signal propagation visualization system 100 can include a telemetry service 112 configured to collect and record data from the plurality of APs 102 or sensors on the floor pertaining to the APs 102 in space. In some examples, the telemetry data can be used to update information about a particular AP (e.g., model, antenna type, etc.) or feed into the visualization service 108 to provide an optimized 3-D visualization instead of relying on a predicted model. In some instances, the telemetry service 112 can utilize the telemetry data to validate a certain predicted model.

The 3-D signal propagation visualization system 100 can also include an analysis service 114 that is configured to analyze data associated with the wireless coverage such as SNR measurements, latency measurements, a number of client devices at each of the APs, KPI values, txPower measurements, or RSSI measurements. In some instances, the analysis service 114 can further perform analysis pertaining to data associated with one or more errors or constraints of the APs 102 that can impact the wireless coverage.

The 3-D signal propagation visualization system 100 can include a troubleshooting service 116 configured to perform various types of troubleshooting by isolating and root-causing issues or errors relating to the network performance and signal propagation pattern based on the APs 102 and providing suggestions to resolve such issues or errors. In some examples, the troubleshooting service 116 can identify both cause and consequences of the issues, for example, obstructions in the line of sight, a level of signal coverage, a number of client devices connected to APs, co-channel interference, or stickiness to APs.

The 3-D signal propagation visualization system 100 can include an optimization service 118 configured to provide a 3-D visualization of the optimized signal propagation pattern that provides better operational signal coverage and lower interference. In some examples, the optimization service 118 can provide an upgrade option for the APs or configuration settings to achieve improved network performance. In some instances, the optimization service 118 can provide the optimized 3-D visualization that illustrates dynamic changes as conditions in the network change. In some examples, the optimization service 118 can propose different optimized layouts by radio spectrum (RF) or deployment of the APs for a given space.

The 3-D signal propagation visualization system 100 can also include a simulation service 120 configured to simulate various scenarios relating to deployment of APs, potential network failures, estimated RF leakage, or alternative network configurations. In some instances, the simulation service 120 can provide a simulated 3-D visualization of the various proposed layouts provided by the optimization service 118.

In some examples, the simulation service 120 can provide a simulated 3-D visualization illustrating the impact of an alternative deployment of APs, for example, how the signal propagation pattern is impacted by deploying a new or upgraded AP at different locations on the floor. Also, the simulation service 120 can simulate a 3-D visualization based on the impact of an upgrade or different AP upgrade strategies prior to the actual update to observe and compare the wireless coverage.

Furthermore, a type of materials of obstructions in the space can significantly impact the signal propagation pattern. The simulation service 120 can provide a simulated visualization of the signal propagation pattern depending on the type of materials of obstacles such as walls or shelving, or what is stored on shelving (e.g., liquid, metal, non-metal, etc.).

Additionally, the simulation service 120 can provide a simulated 3-D visualization illustrating potential network failures. For example, the simulation service 120 can help define coverage zones to avoid coverage blackout zones in common.

The 3-D signal propagation visualization system 100 can also include a user location service 122 configured to identify a location of a user (e.g., client device) and obtain data associated with the user/client device to determine the signal propagation pattern. For example, a client density can significantly affect the wireless network coverage.

In some examples, the user location identified by the user location service 122 can be combined with an AP coverage so that the 3-D visualization can include the impact of the client device such as an operating system of client devices, client device density, or any RF interference due to the presence of RF-emitting device (e.g., mobile phones, cordless phones, wireless security cameras, etc.).

In some examples, the user location service 122 can help to optimize the latency and the signal propagation pattern by identifying the location of client devices and the type of services that the client devices are performing. For example, too many client devices performing VoIP calls on the same AP can worsen the network performance and cause a bad call quality due to latencies. The 3-D visualization of the signal propagation pattern can include the user location provided by the user location service 122 to illustrate such impact of the client devices on the wireless network coverage.

The 3-D signal propagation visualization system 100 can also include a building plan design service 124 configured to allow a user to manage the settings of the building plan or the floor plan of the space (e.g., layout, objects, viewpoint, etc.).

The 3-D signal propagation visualization system 100 can include a building plan import service 126 configured to import a building plan or a floor plan. The building plan or the floor plan can be in any suitable format, for example, a Building Information Modeling (BIM) file or a Computer-Aided Design (CAD) file. In some examples, the building plan import service 126 can import the building plan or the floor plan that contains a technical drawing, blueprint, schematic, or 3-D rendering of the floor that is to be visualized in 3-D.

In some instances, the signal propagation pattern can be overlaid over the building plan or the floor plan provided by the building plan import service 126. Depending on the type of the imported file for the building plan, details of the building or the floor such as a type of materials of the obstacles (e.g., a wall, etc.) or location of APs or sensors can further be included in the building plan.

The 3-D signal propagation visualization system 100 can also include a building plan layout service 128 configured to store the building plan layout and support the 3-D visualization of the building plan layout. In some examples, the building plan layout service 128 can perform the function of a management and control platform for managing, monitoring, and storing data associated with the visualization based on the building plan.

The 3-D signal propagation visualization system 100 can also include a user interface service 130 configured to allow a user to manage and control settings of the visualization or network configurations to optimize the 3-D visualization. For example, the settings can include a viewpoint (e.g., a first-person perspective, an orbit view, or a bird's eye view), layout, parameters (e.g., txPower, SNR measurements, KPI values, RSSI values, etc.), or visualization options. Also, the examples of network configurations can include but are not limited to elevation or azimuth angle of APs, deployment of APs, band and a type of network or APs.

In some instances, the user interface service 130 can provide information to or receive feedback from the user via a communication service 132 as further described below. In some examples, the user may be asked to evaluate and manage various suggestions proposed by the troubleshooting service 116 or the optimization service 118.

The 3-D signal propagation visualization system 100 can also include a communication service 132 configured to transmit and receive information wirelessly over a network. In some examples, the communication service 132 can send and receive communications from/to a building plan system (not shown) that may provide building plan updates. In some instances, the communication service 132 can transmit and receive data from/to a user for analyzing, troubleshooting, simulating, or optimizing the 3-D visualization of the signal propagation pattern.

Figure 2:
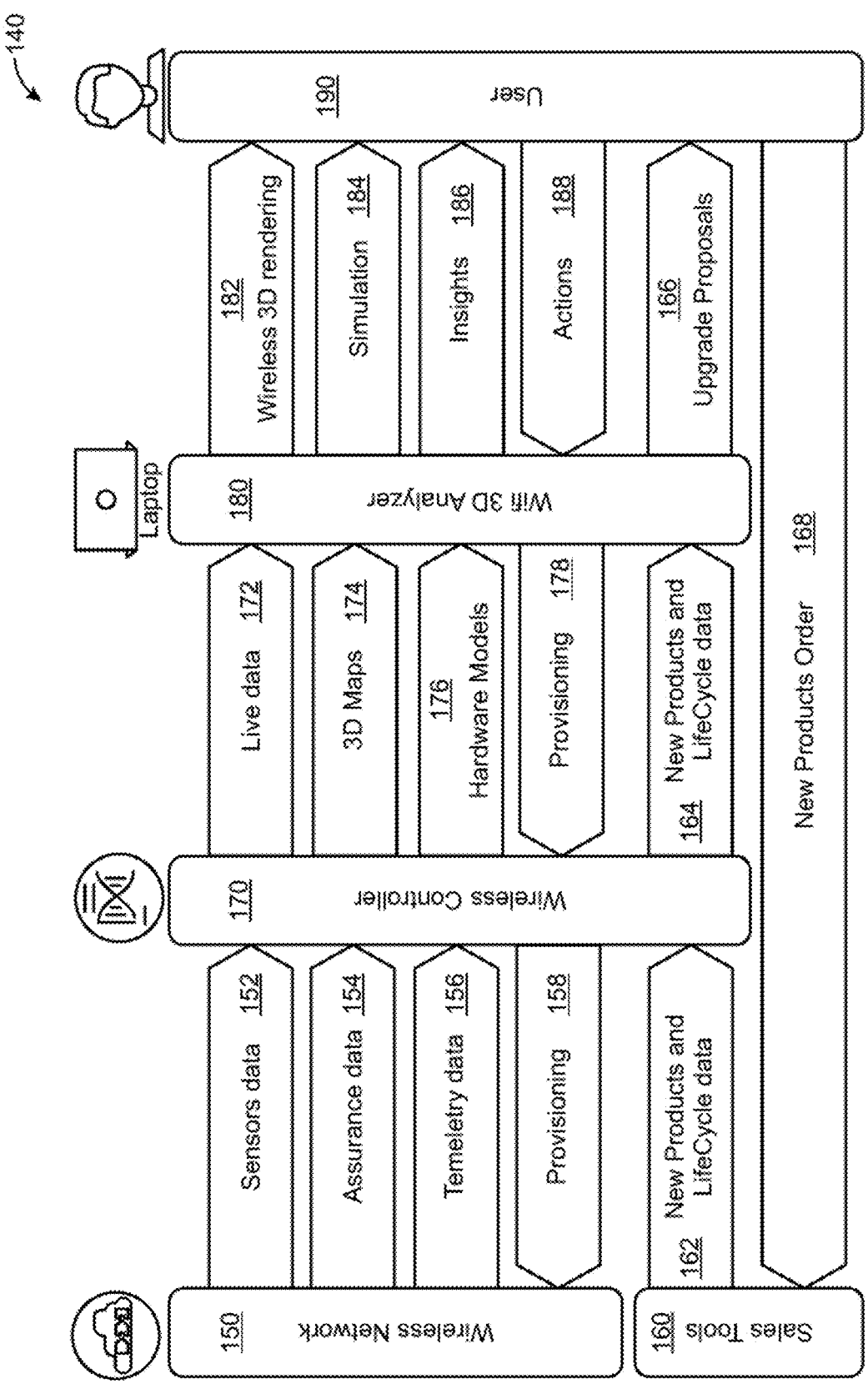
FIG. 2 illustrates an example network architecture of a visualization system for presenting a wireless signal propagation in 3-D according to some aspects of the disclosed technology.

FIG. 2 illustrates an example network architecture 140 for the 3-D signal propagation visualization system 100 illustrated in FIG. 1 according to some aspects of the disclosed technology. The network architecture 140 comprises a wireless network 150, sales tools 160, a network controller 170, a Wi-Fi 3-D analyzer 180, and a user 190. In some embodiments, Wi-Fi 3-D analyzer 180 executes on a client device and takes advantage of hardware acceleration capabilities from a graphics processor, but Wi-Fi 3-D analyzer 180 can operate in other environments such as a server or on a device with only general processing capabilities. Even though the network controller 170 and Wi-Fi 3-D analyzer 180 are illustrated as separate components in FIG. 2, in some examples, they can be a single device (i.e., the Wi-Fi 3-D analyzer 180 is run on the network controller 70 itself).

The wireless network 150 comprises APs 102 illustrated in FIG. 1, sensor(s), and user devices. The network controller 170 can include AP database 104, AP model service 106, telemetry service 112, user location service 122, building plan design service 124, building plan import service 126, and building plan layout service 128, all of which are illustrated in FIG. 1. The Wi-Fi 3-D analyzer 180 can include visualization service 108, analysis service 114, troubleshooting service 116, optimizations service 118, simulation service 120, and user interface service 130, all of which are also illustrated in FIG. 1.

The wireless network 150 can transmit sensor data 152, assurance data 154, and/or telemetry data 156 to the network controller 170. The network controller 170 can store such received data and can provide user interfaces and APIs for receiving network configurations and updates. Network configurations can be used to provision 158 various devices in wireless network 150. Also, the network controller 170 can transmit live data 172, 3-D maps 174 (e.g., 3-D building plans or floor plans), and/or hardware models 176 to the Wi-Fi 3-D analyzer. While not shown in FIG. 2, alternatively, live data 172, 3-D maps 174, and/or hardware models 176 can be exported to cloud instead of a local PC or GPU and provide user 190 with insights 186.

The Wi-Fi 3-D analyzer 180 can use the 3-D maps 174 and hardware models 176 to generate predictions or simulations of wireless signal propagation and their correlation with the live data 172. Based on the data received from the network controller 170, the Wi-Fi 3-D analyzer 180 can provide wireless 3-D rendering 182, simulation 184, and/or insights 188 to the user 190. For example, the user can be provided with the wireless 3-D rendering 182 of the wireless signal coverage (e.g., RF coverage) and options to run simulations 184 for what-if scenarios, and insights 186 including suggestions for improving the network performance associated with the wireless signal coverage. Based on what is provided by the Wi-Fi 3-D analyzer 180, the user 190 can take action 188 accordingly, for example, modifying a network configuration to improve the network performance. Wi-Fi 3-D analyzer 180 can forward any updates to the network configuration for provisioning 178 to the network controller 170.

Furthermore, the sales tools 160 can provide a product upgrade management based on the communication flow between the sales tools 160, the network controller 170, and the Wi-Fi 3-D analyzer 180. The sales tools 160 can transmit new products and lifecycle data 162 to the network controller 170. Then the network controller 170 forwards the new products and lifecycle data 164 to the Wi-Fi 3-D analyzer 180. The new products and lifecycle data 162 and 164 can include new product availability for sale or end-of-life dates for AP products.

Based on the new products and lifecycle data 164, the Wi-Fi 3-D analyzer 180 can provide upgrade proposals 166, which can include simulation 184 and insights 186 on product upgrade, to the user 190. Also, in response to the upgrade proposals, the user 190 can place a new product order 168 by utilizing the sales tools 160. For example, the new products and lifecycle data 162 can include end-of-life data associated with a particular AP so that an upgrade or replacement of a new AP can be recommended based on the end-of-life data prior to the expiry of the AP. Also, the user 190 can place an order for a new AP with the sales tools 160.

Figure 3:
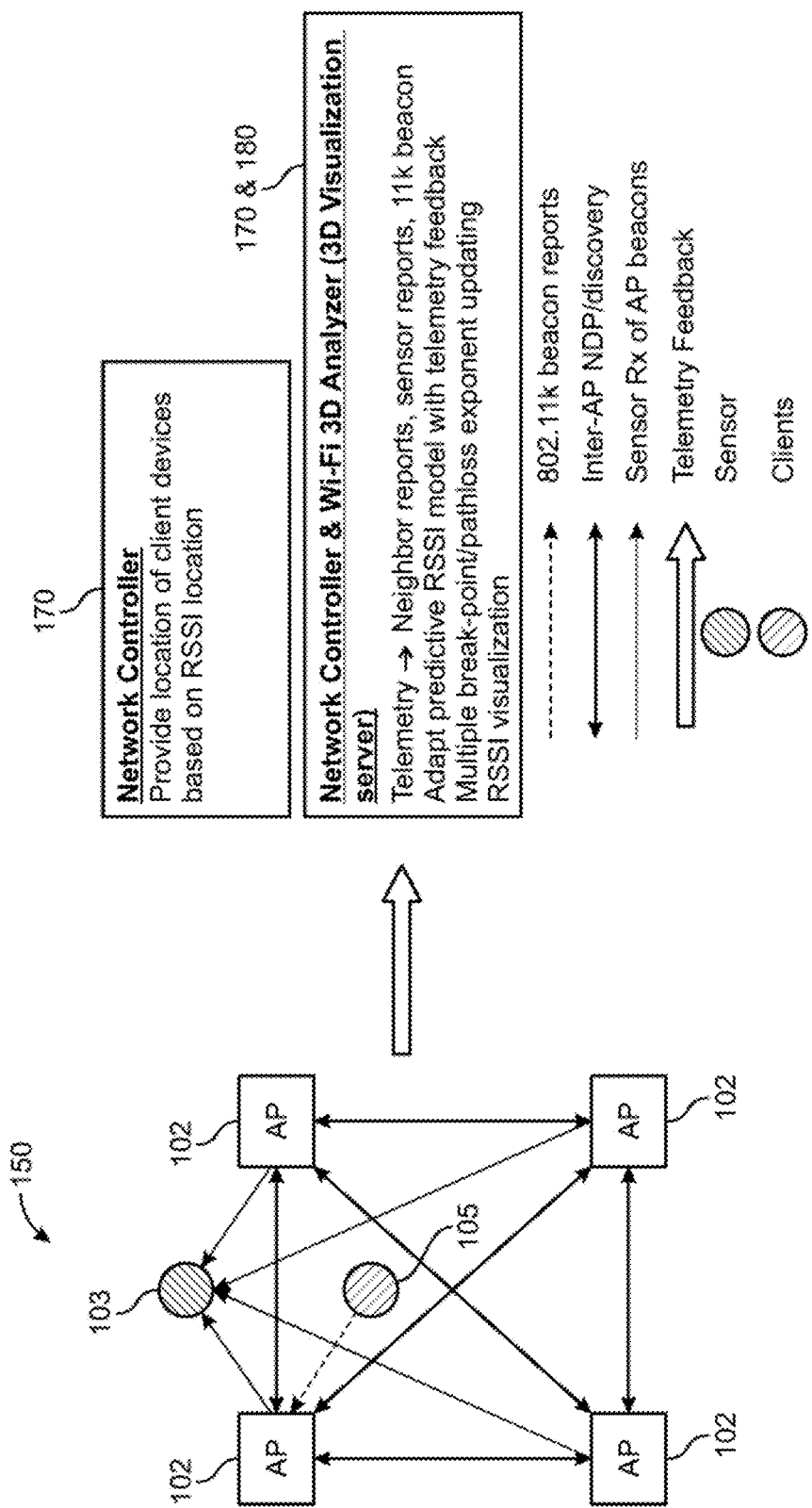
FIG. 3 illustrates an example network architecture diagram of a visualization system for presenting a wireless signal propagation in 3-D according to some aspects of the disclosed technology.

FIG. 3 illustrates an example network architecture diagram for a wireless network 150, a network controller 170, and a Wi-Fi 3-D analyzer 180 according to some aspects of the disclosed technology. The wireless network 150, also illustrated in FIG. 2, comprises APs 102 and sensors 103 and client devices 105.

The wireless network 150 can transmit telemetry feedback (for example, telemetry data 156 illustrated in FIG. 2) to the network controller 170. For example, each AP 102 transmits beacons to the sensor 103 whereby a sensor report can be generated. Also, the APs 102 communicate with each other via inter-AP Neighbor Discovery Protocol (NDP) to generate neighbor reports. Furthermore, client device 105 measures beacons and returns a report with stored beacon information (e.g., 802.11k beacon reports). Based on the neighbor reports, 802.11k beacon reports, and sensor reports, the wireless network 150 provides telemetry feedback to the network controller 170. The telemetry feedback can include information about a distance and azimuth angle between a pair of APs or an AP and a sensor and walls or any obstructions between the pair on a building plan or a floor plan. Also, network controller 170 includes location information of client devices based on RSSI location, which is received from the wireless network 150.

Based on the data provided by the wireless network 150, the network controller 170 and the Wi-Fi 3-D analyzer 180 can determine a predictive RSSI model and visualize the predicted RSSI at all 3-D locations.

Figure 4:
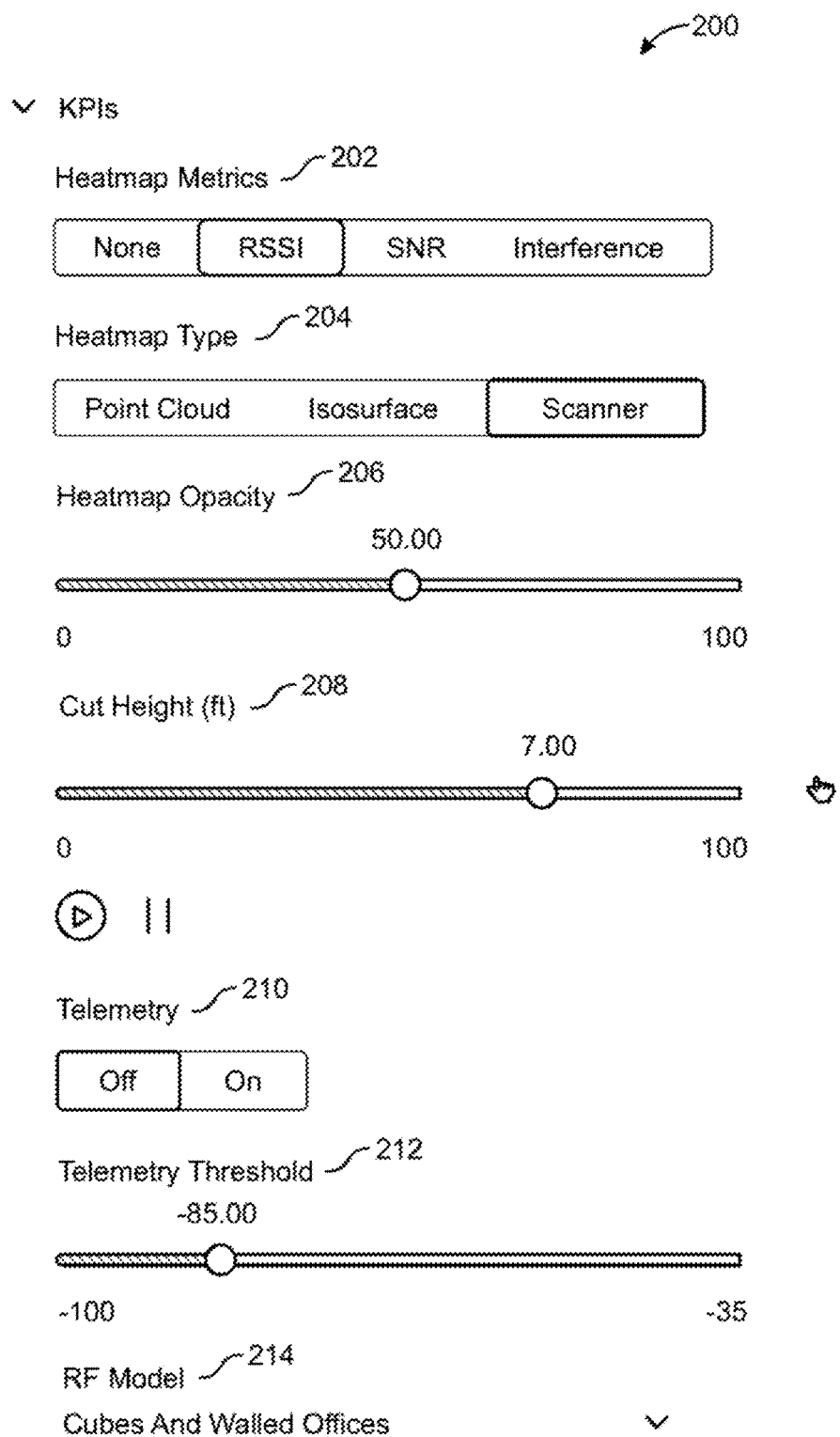
FIG. 4 illustrates an example control menu for a 3-D visualization system according to some aspects of the disclosed technology.

FIG. 4 illustrates an example menu 200 including a list of various parameters that can be adjusted for the 3-D visualization of the wireless signal propagation.

The menu 200 provides an option for key performance indicator (KPI) heatmap metrics 202, for example, none, RSSI, SNR, or Interference. Depending on the selected heatmap metrics, the 3-D visualization of the wireless signal propagation can be presented based on RSSI values, SNR measurements, or interference measurements. RSSI values are a predicted or measured power level at a point in space of an RF transmitted from an AP. SNR measurements are based on the amplitude of signal and noise level. Interference measurements or predictions are based on the power of the interfering signals.

The menu 200 also provides an option for heatmap type 204, for example, point cloud, isosurface, or scanner. A point cloud heatmap provides the 3-D visualization of the wireless signal propagation as a collection of color-coded points where a color variation corresponds to a degree of signal strength. An isosurface heatmap displays the 3-D visualization of the wireless signal propagation with isosurfaces (e.g., contour lines or surfaces) where each isosurface represents points of equal values in a 3-D space. A scanner provides the 3-D visualization of the wireless signal propagation with color-coded bands where the color of the bands correspond to a degree of signal strength. Also, the scanner allows a user to manipulate a height in the 3-D space, for example, via a height manipulation bar under a cut height 208 so that the wireless signal propagation pattern can be scanned through the 3-D space, for example, from a ground to a ceiling and visualized at varying heights.

Furthermore, a heatmap opacity 206 can be adjusted, for example, in a scale of 0 (i.e., non-transparent) to 100 (i.e., fully transparent) to adjust the transparency of the 3-D visualization.

Also, cut height (ft) 208 can be adjusted, for example, in a scale of 0 to 10. A user can select a particular height where the 3-D visualization is desired. Or, with a play button and a pause button, the 3-D visualization of the wireless signal propagation can be simulated at continuously varying heights from 0 ft to 10 ft.

The menu 200 also provides an option where a visualization of telemetry data 210 can be switched on and off. Also, telemetry threshold 212 can be adjusted, for example, in a scale of −100 to −35.

Furthermore, the menu 200 provides an option for a RF Model selection 214. For example, a drop-down list provides various options for the RF model such as cubes and walled offices, drywall offices, or open space.

While not shown in FIG. 4, menu 200 can include different or alternative options. For example, menu 200 could include an option for clipping a 3-D floor plan to take cross-sections of the floor plan to allow clear visualization of an area of interest. Menu 200 could include an adjustable noise floor to be used in calculating a signal-to-noise ratio (SNR). Menu 200 could include an option to change the model of AP being visualized to permit comparisons between various hardware options. Menu 200 could include an option to adjust the frequency band from 2.4 GHz to 5 GHz to visualize attributes associated with RF propagation at those frequencies. The 2.4 GHz band typically provides a greater distance of coverage, while the 5 GHz band typically provides faster communication speeds. Menu 200 can include antennae options that might permit visualizations using directional antennas or omnidirectional antennas. Menu 200 could provide options for adjusting transmission power of an antenna, or a channel. Menu 200 could also provide various sliders for visualizing animations such as a time scale. Accordingly, the menu can provide many options that can vary depending on the type of visualization being presented.

Figure 5:
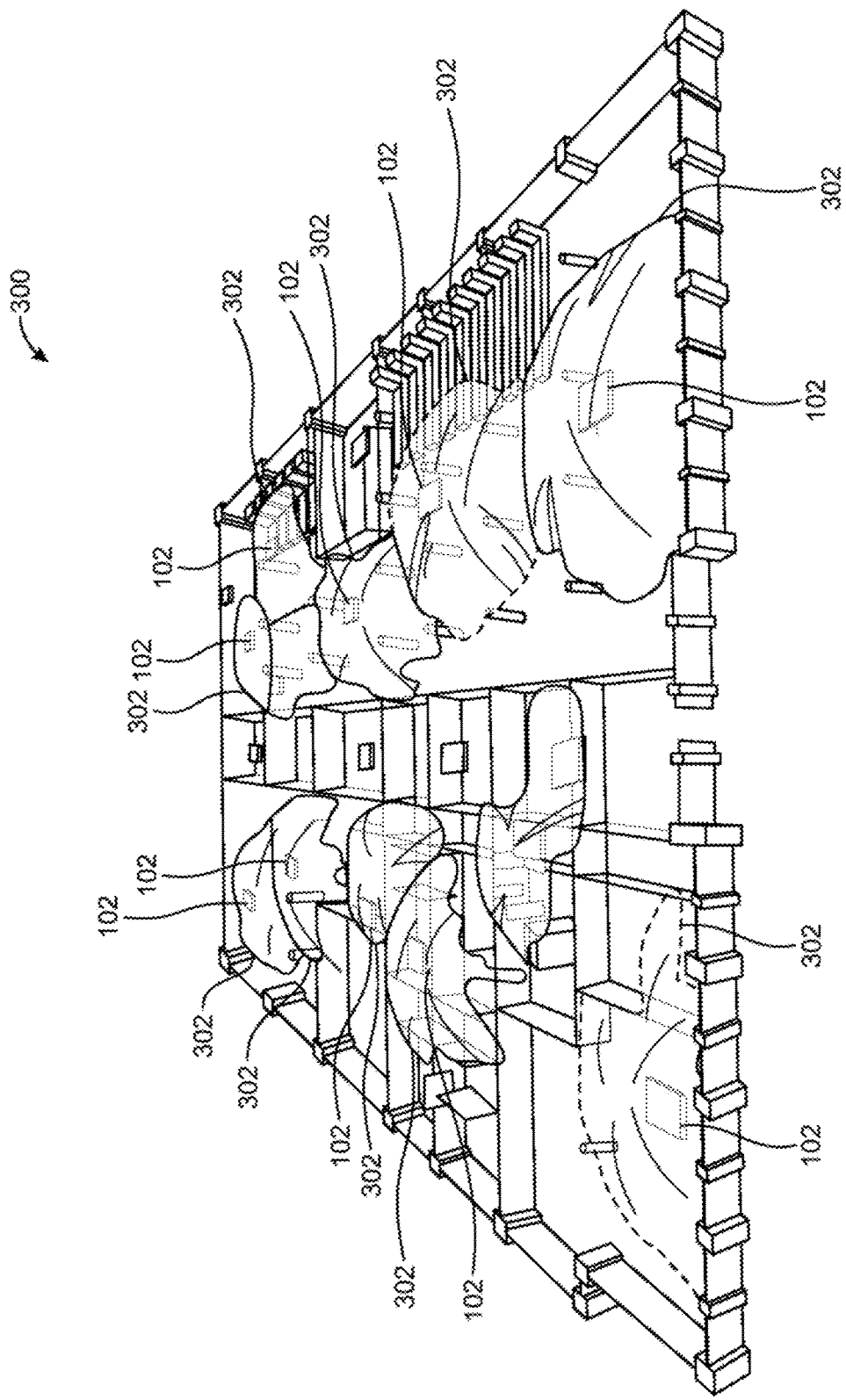
FIG. 5 illustrates an example 3-D visualization of a wireless signal propagation according to some aspects of the disclosed technology.

FIG. 5 illustrates an example 3-D visualization 300 of Wi-Fi AP RF signal propagation. In the 3-D visualization 300, the 3-D visualization of a building plan (e.g., floor plan) is overlaid with RF propagation patterns. As shown in FIG. 5, the 3-D visualization 300 illustrates the RF signal propagation patterns as a collection of zones 302 where each zone represents a service area covered by each AP 102 (e.g., AP 102 illustrated in FIG. 1). Each zone is in the shape of a dome to illustrate a signal strength in the service area in 3-D instead of a simple flat layer in 2-D. Furthermore, the color and size of the domes correspond to a degree of signal strength from the AP in the service area. In FIG. 5 color is distinguished by domes that outlined in solid or dashed lines. The dome shape acknowledges that the RF propagation from an AP is not uniform at all heights of a floor plan. The dome shape is determined from calculating the RF propagation attribute at many points in X, Y, and Z space.

While it is difficult to see in FIG. 5 domes representing RF signal propagation and overlap one another. This is more easily viewed on a computer graphical user interface that can use translucent shading to indicate overlapping regions.

Even though the 3-D visualization 300 of Wi-Fi AP RF signal propagation in FIG. 5 uses a color-coded dome model, the 3-D visualization of the RF signal propagation according to the present disclosure can be provided in the form of a point cloud model, a heat map, or a contour map to illustrate the degree of signal strength in the 3-D space.

Figure 6A:
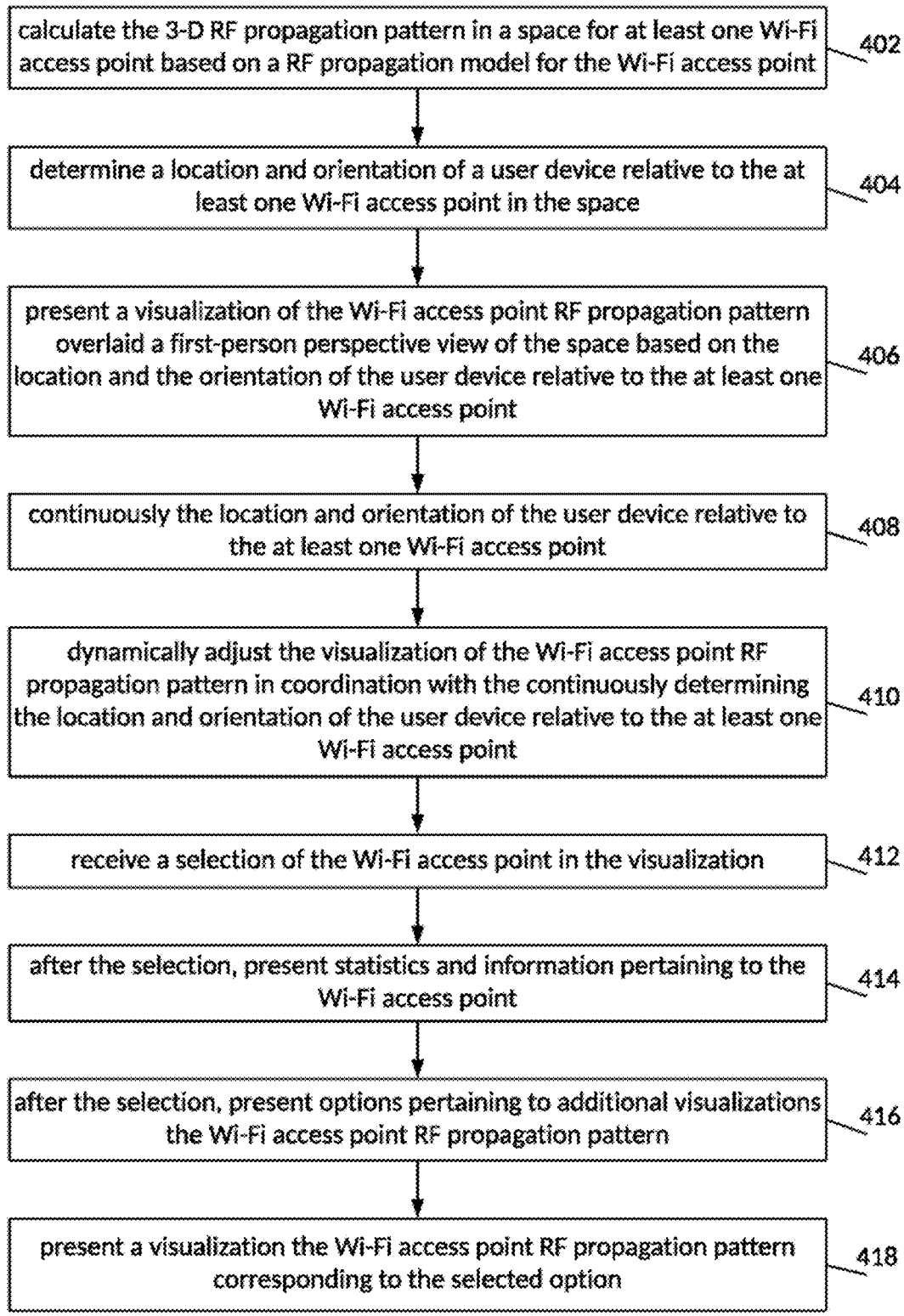
FIG. 6A is a flowchart of an example method for visualizing a W-Fi access point 3-D RF propagation pattern in Augmented Reality (AR) according to some aspects of the disclosed technology.

FIG. 6A illustrates an example method for visualizing a W-Fi access point 3-D radio frequency (RF) propagation pattern in Augmented Reality (AR). Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some embodiments, the method includes calculating the 3-D RF propagation pattern in a space for at least one Wi-Fi access point based on a RF propagation model for the Wi-Fi access point at block 402. For example, the visualization service 108 illustrated in FIG. 1 may calculate the 3-D RF propagation pattern in a space for at least one Wi-Fi access point based on a RF propagation model for the Wi-Fi access point, the antenna pattern of the Wi-Fi access point, the configuration of the Wi-Fi access point (txPower, azimuth, elevation, band and channel) and the geometry of a space as defined in a building plan.

Figure 6B:
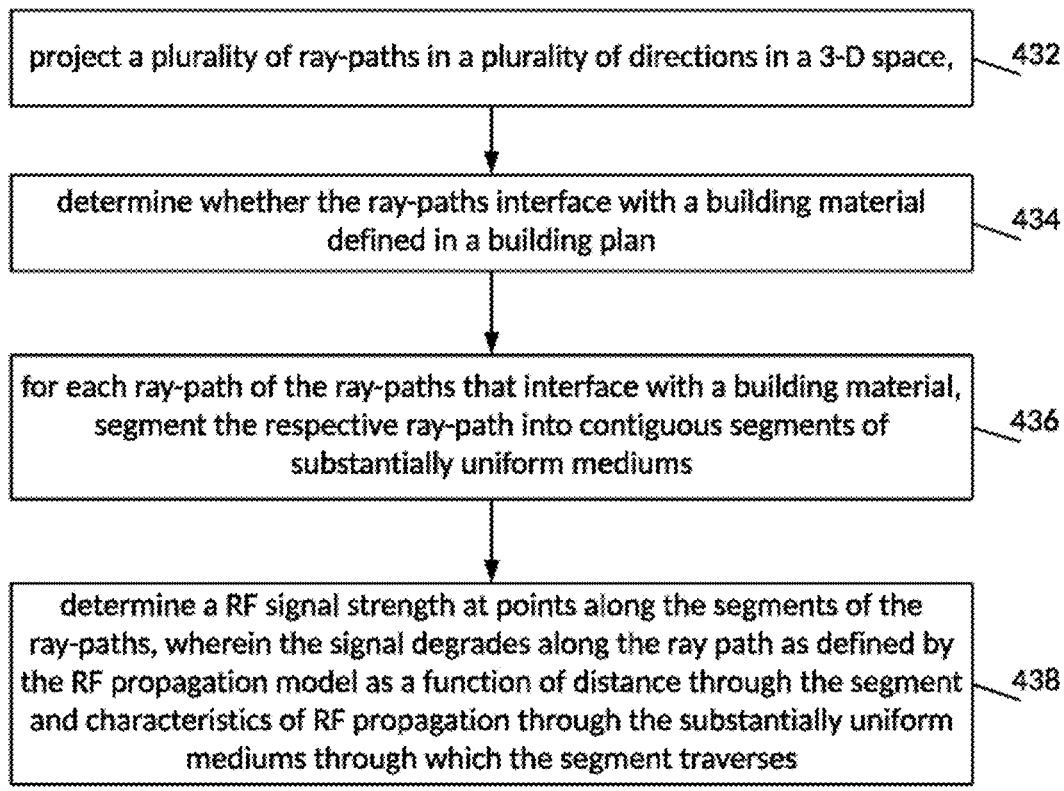
FIG. 6B is a flowchart of an example method for determining an RF signal strength at points distributed in a 3-D space according to some aspects of the disclosed technology.

An example method for calculating the 3-D RF propagation pattern is illustrated in FIG. 6B. The method includes projecting a plurality of ray paths in a plurality of directions in a 3-D space at block 432. For example, the ray tracing service 110 illustrated in FIG. 1 may project a plurality of ray paths in a plurality of directions in a 3-D space. In some embodiments, the ray paths originate from the Wi-Fi access point and emanate in a variety of X, Y, and Z planes.

The method includes determining whether the ray paths interface with a building material defined in a building plan at block 434. For example, the ray tracing service 110 illustrated in FIG. 1 may determine whether the ray paths interface with a building material defined in a building plan.

The method includes segmenting each ray-path of the ray-paths that interface with a building material the respective ray-path into contiguous segments of substantially uniform mediums at block 436. For example, the ray tracing service 110 illustrated in FIG. 1 may segment the respective ray path into contiguous segments of substantially uniform mediums.

The ray-tracing service 110 can provide the segmented ray paths to an AP model service 106. The combination of the collection of ray paths for any access point and model information from AP model service 106 can be provided to visualization service 108.

The method includes determining a RF signal strength at points along the segments of the ray-paths at block 438. For example, the visualization service 108 illustrated in FIG. 1 may determine a RF signal strength at points along the segments of the ray paths. The visualization service 108 can use the information about the collection of ray paths for any access point and a RF propagation model particular to the type of access point and the parameters for the specification access point to determine the RF signal strength at points along the segments of the ray-paths. In some embodiments, the signal degrades along the ray path as defined by the RF propagation model as a function of distance through the segment and characteristics of RF propagation through the substantially uniform mediums through which the segment traverses.

In order to present a visualization in augmented reality (AR), visualization service 108 needs to receive inputs of both precise location and orientation information from the user device. This information is needed to coordinate an image scene captured by a user device 105 camera and displayed on a display of the user device 105, and the calculated RF propagation model so that the RF information can be overlaid the image of the scene displayed by the user device 105. This location and orientation information can come from multiple sources.

According to some embodiments, the method includes determining a location and orientation of a user device relative to at least one Wi-Fi access point in the space at block 404. For example, the user location service 122 illustrated in FIG. 1 may determine a location and orientation of a user device relative to at least one Wi-Fi access point in the space. For this source of location and orientation information, user location service 122 can utilize information reported by user device 105 regarding signal strength of nearby access points to perform multilateration or other location identifying techniques that will work indoors. However such techniques are often only accurate within a range of several meters, and therefore this technique on its own may not be precise enough.

Another source of location and orientation information can be from the user device 105 if the user device 105 is capable of detecting and ranging the floor plan. In such embodiments, a user device can use machine vision techniques to estimate its distance from one or more objects, but these techniques are not accurate enough to identify a location in space on their own. In another mechanism of detecting and ranging, the user device 105 would need to be capable of creating a point cloud, like a LiDAR point cloud of all surfaces in the space, and coordinate such a point cloud with the building plan layout service 128. Unfortunately, not all devices have such a capability. Also, floor plans can change, and furniture can be added or removed which can cause problems when coordinating a point cloud detected by the device with the floor plan in the building plan layout service 128.

Another way of locating and orientating the user device 105 relative to at least one Wi-Fi access point in the space includes detecting at least one indicator on the Wi-Fi access point that uniquely identifies the Wi-Fi access point and/or the location of the Wi-Fi access point. For example, the user device 105 may detect at least one indicator or marker on the Wi-Fi access point that uniquely identifies the Wi-Fi access point and/or the location and/or the orientation of the Wi-Fi access point. In some embodiments, at least one indicator is a QR code, symbols, an optical pattern, a pattern of blinking lights, or the orientation and geometry of a housing of the Wi-Fi access point. An example of such indicators can be seen in FIG. 7. Using this method, the user device 105 can look up information about the indicator in AP database 104 to learn where the AP 102 is located on the floor plan. The user device 105 then only needs to determine how close it is to the identified AP 102, which can be accomplished in combination with one of the other sources of location information described herein. While those other sources such as multilateration or determining a range of an object using machine vision might not be sufficient to identify a precise location on their own, they can be much more precise in combination with a known marker. Additionally, once an initial location is known, the mobile device can use other sensors such as gyroscopes and accelerometers to track movement from the initial location.

The detection of at least one indicator at block 448, is further useful not only to determine a more precise location but also for determining an orientation of the Wi-Fi access point in the space. It is important to know the orientation of the Wi-Fi access point for several reasons. For example, when the orientation of the Wi-Fi access point is known, this can be used to determine the orientation of the user device 105 in space as well. The known orientation of the Wi-Fi access point is a reference point. In addition, it is important to know the orientation of the Wi-Fi access point because some Wi-Fi access points have directional antennas. The user device 105 can identify a marker on the Wi-Fi access point, look up the Wi-Fi access point based on the marker indicating the orientation of the Wi-Fi access point in AP database 104, and receive information about the configuration of the Wi-Fi access point and its antennas relative to the orientation indicated by the visible markers. An example of a marker on an access point can be seen in FIG. 8.

Further, at least one indicator on the Wi-Fi access point is important for uniquely identifying the particular Wi-Fi access point. A visible marker can be used to identify the access point, and user device 105 can communicate with AP database 104 to learn an identification of the Wi-Fi access point, its location, and/or its orientation in the space. As noted above, this information is important to learn information about configurations of the access point, and orientations of the Wi-Fi access point 102 and user device 105. All of this information can be provided to visualization service 108.

According to some embodiments, once a location of the user device 105 is known, the method includes presenting a visualization of the Wi-Fi access point RF propagation pattern overlaid a first-person perspective view of the space based on the location and the orientation of the user device relative to the at least one Wi-Fi access point at block 406. For example, the visualization service 108 illustrated in FIG. 1 may present a visualization of the Wi-Fi access point RF propagation pattern overlaid a first-person perspective view of the space based on the location and the orientation of the user device relative to at least one Wi-Fi access point. In some embodiments, the first-person perspective view of the space is an augmented reality view of the space, wherein a live image is captured and displayed by user device 105, and visualization service 108 overlays the visualization over the live image. Examples of some AR visualizations are illustrated in FIG. 9A, FIG. 9B, FIG. 10, FIG. 11, and FIG. 12.

In some embodiments, the visualization of the Wi-Fi access point RF propagation pattern illustrates at least one attribute of the Wi-Fi propagation pattern, such as signal-to-noise ratio (SNR), signal strength, interference, the channel of the access points, etc. In some embodiments, at least one Wi-Fi access is a plurality of Wi-Fi access points, and the visualization of the Wi-Fi access point RF propagation pattern illustrates RF propagation patterns for the plurality of Wi-Fi access points. For example, the visualization can display a RF propagation from a plurality of Wi-Fi access points which might allow a user to see coverage area overlaps or gaps, or interference between the RF propagation patterns, among other insights.

The AR visualization can also include a labeled reference icon indicating a first Wi-Fi access point in the space through which the user device is presently communicating. For example, the visualization service 108 illustrated in FIG. 1 may include a reference icon indicating a first Wi-Fi access point in the space through which the user device is presently communicating. This can be useful when the AR visualization is displaying information about a particular Wi-Fi access point that is different than the access point through which the user device 105 is communicating. Should the user of user device 105 want to see information about the Wi-Fi access point to which its user device is attached, the AR visualization can provide an arrow or other indicator to guide the user toward the access point to which their device is connected.

In some embodiments, the AR visualization can be particularly useful to see coverage around objects that do not appear in a building plan. For objects that do appear in a building plan, it is possible to simulate or virtualize the objects in the building plan and view them by walking through a virtual floor plan, but for objects that exist in real life, but are not in the floor plan the virtual or simulated environment will not have knowledge of these objects and the will not be displayed. Accordingly, the AR visualization can be used to view Wi-Fi coverage around objects such as desks or other furniture or other objects that exist in the physical space that are not present on the floor plan.

Further, the method can include detecting an object that does not appear in the building plan. For example, the visualization service 108 illustrated in FIG. 1 may detect the object that does not appear in the building plan in the video captured by the user device 105 and can label the object that does not appear in the building plan when an aspect of the Wi-Fi access point RF propagation pattern surrounding the object is of poor quality as indicated by the aspect of the RF propagation pattern being below a threshold. For example, the AR visualization can draw the user's attention to objects that are not receiving quality Wi-Fi coverage. In some embodiments, the visualization service 108 can include machine vision capabilities to recognize objects that should be surrounded by quality Wi-Fi coverage. For example, it is more important to identify a desk that does not have quality Wi-Fi coverage, but it is not important to identify a plant that does not have good Wi-Fi coverage. Accordingly, in some embodiments, the highlighting objects that do not have good Wi-Fi coverage can be limited to certain types of objects that the visualization service 108 is trained to recognize.

According to some embodiments, the method includes continuously determining the location and orientation of the user device relative to at least one Wi-Fi access point at block 408. For example, the mobile device 105 illustrated in FIG. 3 may continuously determine the location and orientation of the user device relative to at least one Wi-Fi access point.

According to some embodiments, the method includes dynamically adjusting the visualization of the Wi-Fi access point RF propagation pattern in coordination with continuously determining the location and orientation of the user device relative to at least one Wi-Fi access point at block 410. For example, the visualization service 108 illustrated in FIG. 1 may dynamically adjust the visualization of the Wi-Fi access point RF propagation pattern in coordination with the continuously determined location and orientation of the user device relative to at least one Wi-Fi access point.

Figure 9A:
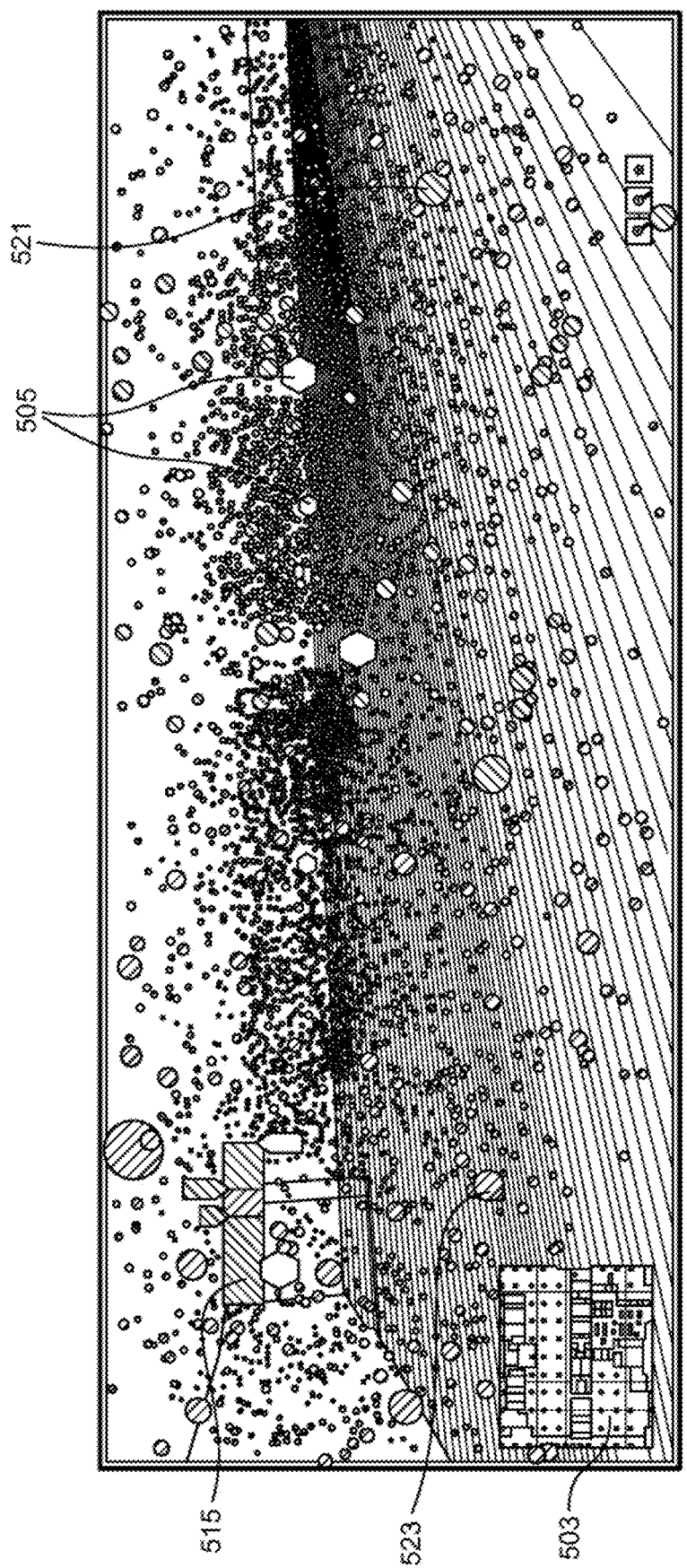
FIG. 9A illustrates an example augmented reality (AR) visualization showing an RF signal attribute as a point cloud according to some aspects of the disclosed technology.
Figure 9B:
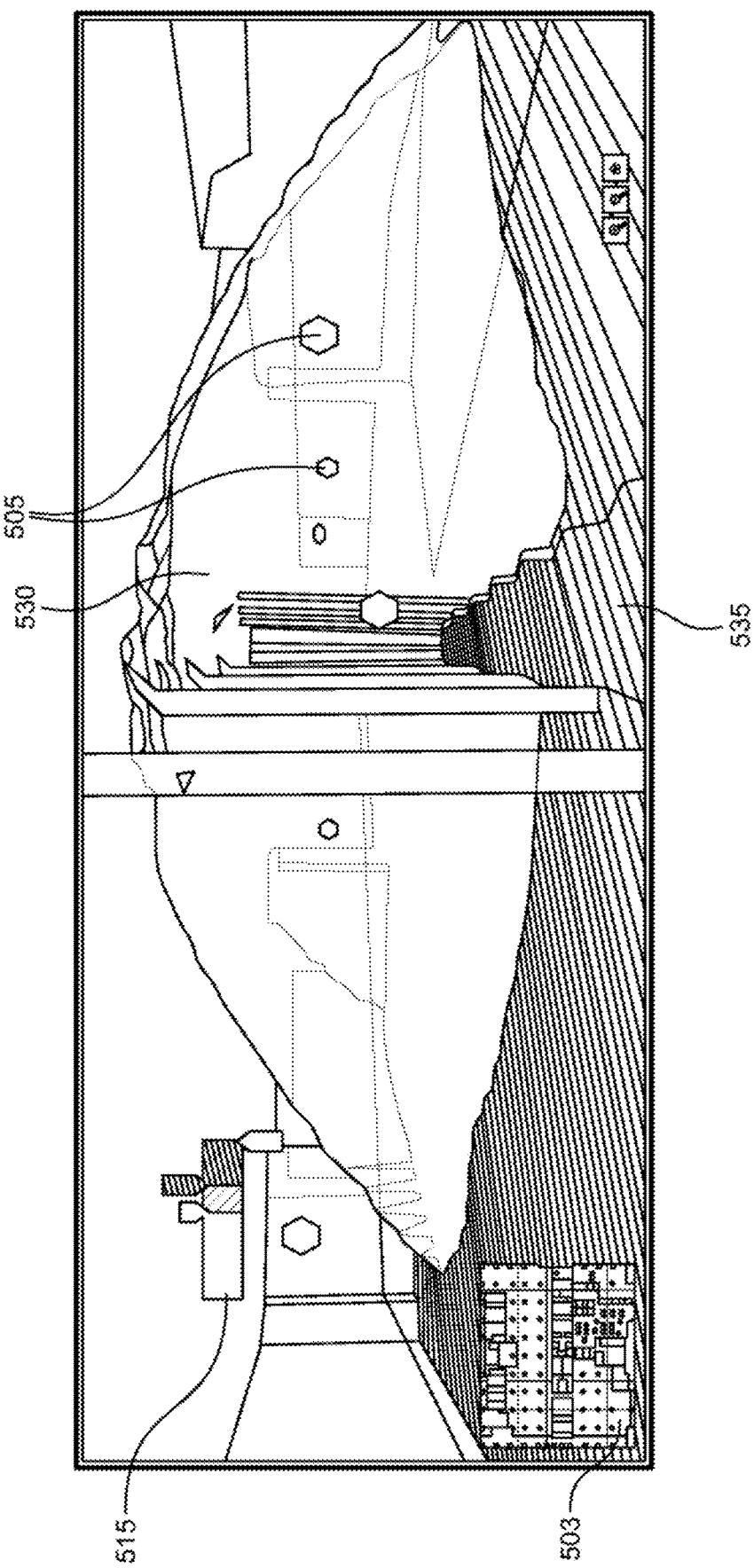
FIG. 9B illustrates an example augmented reality (AR) visualization showing an RF signal attribute as an iso-surface view according to some aspects of the disclosed technology.

In another example of the dynamically adjusting the visualization of the Wi-Fi access point RF propagation pattern in coordination with the continuously determining the location and orientation of the user device relative to at least one Wi-Fi access at block 410, the method comprises representing the visualization of the Wi-Fi access point propagation in a first style at a first location of the user device, and representing the visualization of the Wi-Fi access point propagation in a second style at a second location of the user device For example, as the user moves around with the user device 105, they can enter a bubble representing an RF propagation pattern or leave a bubble. The bubbles or 3-D areas representing the RF propagation pattern can be color-coded according to various attributes and as the user moves around a floor plan the RF propagation attributes might change. In one example, when the user is at a first location, they might be viewing the RF signal strength of a Wi-Fi access point. The RF signal strength can be represented showing a green surface representing a boundary within which the RF signal strength from the access point is greater than −65 dB. As the user moves further away from the access point, they might see another boundary in red within which the RF signal strength is greater than −80 dB. An example of such visualizations is illustrated at FIG. 9A and FIG. 9B.

In addition, to update the AR visualization to correspond to movements of the user device 105, the AR visualization can include an interactive user interface. According to some embodiments, the method includes receiving a selection of the Wi-Fi access point in the visualization at block 412. For example, the user interface service 130 illustrated in FIG. 1 may receive a selection of the Wi-Fi access point in the visualization.

In response to receiving the selection of the Wi-Fi access point, the visualization service 108 can present statistics and information pertaining to the Wi-Fi access point at block 414.

In some embodiments, the visualization service 108 can present options pertaining to additional visualizations of the Wi-Fi access point RF propagation pattern at block 416. In response to the user interface service 130 receiving a selection of one or more options pertaining to additional visualizations of the Wi-Fi access point RF propagation pattern, the visualization service 108 can present a visualization of the Wi-Fi access point RF propagation pattern corresponding to the selected option at block 418. For example, a user could select an option to show RF signal strength, or channels of access points, or interference areas, etc.

Figure 6C:
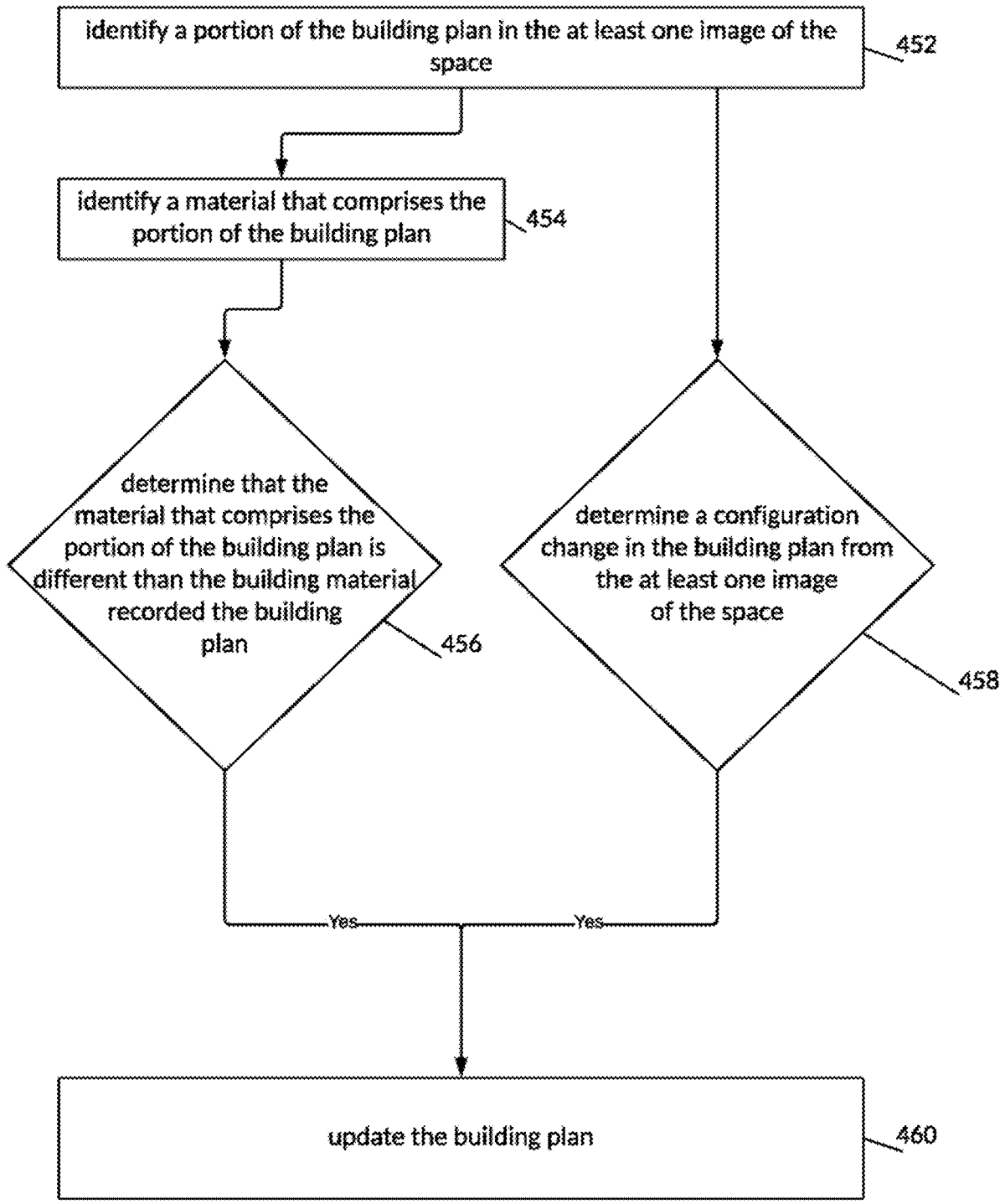
FIG. 6C is a flowchart of an example method for updating a building plan from identified differences between a building plan and reality as captured and detected by a user device according to some aspects of the disclosed technology.

FIG. 6C illustrates an example embodiment wherein the images captured by the user device of objects in the building plan can be used to update data in the building plan file.

In some embodiments, the method comprises identifying a portion of the building plan in at least one image of the space at step 452. For example, the visualization service 108 illustrated in FIG. 1 may identify a portion of the building plan in at least one image of the space that is captured by user device 105.

Further, the method includes identifying a material that comprises the portion of the building plan at step 454. For example, the visualization service 108 illustrated in FIG. 1 may identify a material that comprises the portion of the building plan and can determine that the material that comprises the portion of the building plan is different than the building material recording the building plan for the portion of the building plan at step 456. For example, when the visualization service 108 illustrated in FIG. 1 determines that the material that comprises the portion of the building plan is different than the building material recorded the building plan for the portion of the building plan, the visualization service 108 can update the building plan with the identified material at step 460. This can be useful when some change has occurred since the building plan was created. Whether different materials had to be used during building or a renovation occurred, the present method can be used to automatically update the building plan file.

In some embodiments, the method comprises identifying a configuration change in the building plan from at least one image of the space at step 459. For example, the visualization service 108 illustrated in FIG. 1 may identify a configuration change in the building plan as compared to the recorded building plan from at least one image of the space. For example, the configuration change could be due to a renovation since the building plan file was last updated, or maybe workstations have been moved or installed. When it is determined that a configuration change has occurred, the visualization service 108 illustrated in FIG. 1 may update the building plan with an updated configuration.

The updated configurations can be used by the visualization service to calculate more accurate RF propagation patterns for the current parameters of the floor plan.

Figure 7:
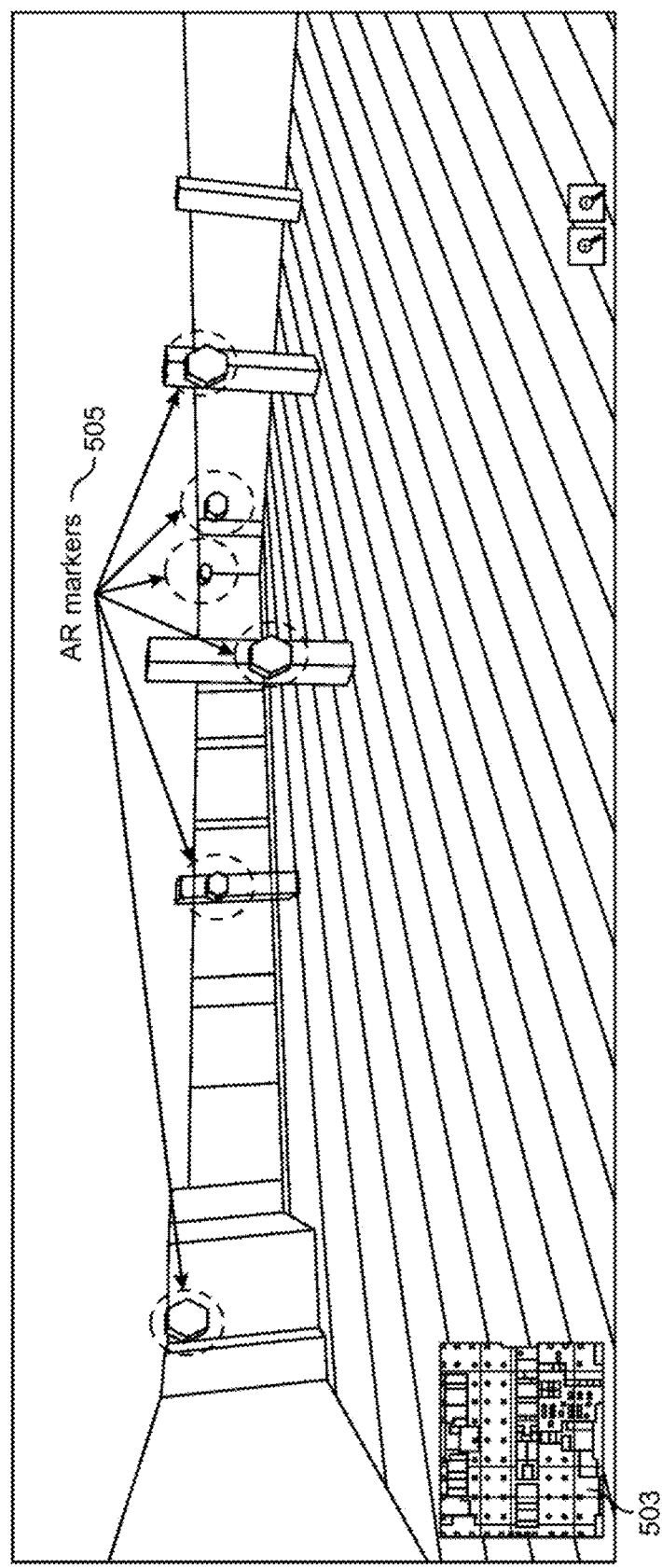
FIG. 7 illustrates example AR markers for use in locating a user device in a floor plan according to some aspects of the disclosed technology.

FIG. 7 illustrates an example AR visualization captured by user device 105 and presented on the display of user device 105. The visualization includes an image or video of a space that is part of a building plan. As illustrated in FIG. 7, there is a plurality of AR markers 505 located throughout the space. These AR markers can be recognized by user device 105 using machine vision techniques. Each of these markers is unique and thus user device 105 can uniquely identify a particular AR marker and then look up the AR marker in a database to receive information regarding the location of the AR marker in the building plan. In addition, some of their markers can be placed on Wi-Fi access points and can be used to uniquely identify the access point as addressed above. In some embodiments, the marker is a QR code, symbols, an optical pattern, a pattern of blinking lights, or the orientation and geometry of a housing of the Wi-Fi access point. Using this method, the user device 105 can look up information about the marker in AP database 104 to learn where the AP 102 is located on the floor plan. The user device 105 then only needs to determine how close it is to the identified AP 102, which can be accomplished in combination with one of the other sources of location information described herein. While those other sources such as multilateration or determining a range of an object using machine vision might not be sufficient to identify a precise location on their own, they can be much more precise in combination with a known marker. Additionally, once an initial location is known, the mobile device can use other sensors such as gyroscopes and accelerometers to track movement from the initial location.

FIG. 7 also illustrates a thumbnail floorplan 503 providing context to the user by illustrating the current location of user device 105 in the floor plan.

Figure 8:
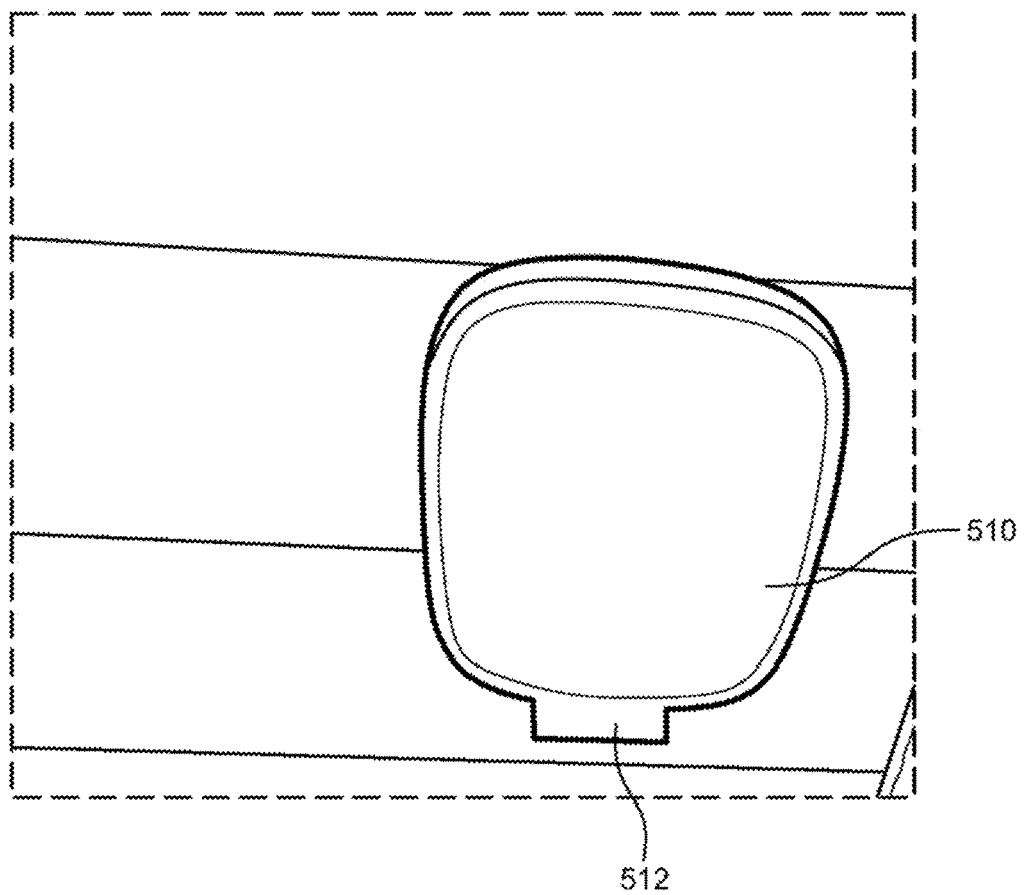
FIG. 8 illustrates an example access point having an indicator for use in determining an orientation of the access point according to some aspects of the disclosed technology.

FIG. 8 illustrates an example access point 510. Access point 510 has an appended indicator 512. Indicator 512 can be used to determine a particular orientation of the access point. As addressed above it is not enough to merely identify an access point, it is important to know the orientation of the access point and the relative orientation of the user device to the access point 510 in order to provide accurate RF projections.

In some embodiments, indicator 512 can be physically appended to access point 510. In some embodiments indicator, 512 can be a marker or drawing or symbol labeled on access point 510.

FIG. 9A and FIG. 9B illustrates an example AR visualization showing a portion of a floor plan captured by a camera and displayed on a display of a mobile device 105. Mobile device 105 can recognize one or more markers 505 to help identify the location and orientation of mobile device 105 in the floor plan.

As addressed above, visualization service 108 can present a visualization overlaid the captured floor plan. As illustrated in FIG. 9A, visualization service 108 can display radio frequency (RF) signal strength overlaid the view captured by the camera of mobile device 105. The RF signal strength (or any other selected key performance indicator (KPI)) can be illustrated as a collection of points in a point cloud. Some points, such as those labeled 525, have a signal strength greater than a first threshold such as −65 decibels can be illustrated in one color whereas some points, such as those labeled 521, have a signal strength greater than a second threshold, such as −90 decibels but greater than −65 decibels, can be displayed in a second color.

In some embodiments, the visualization overlayed the captured floorplan can also include a user interface element 515 that is effective to adjust the signal strength thresholds corresponding to the first threshold and the second threshold.

FIG. 9B illustrates a similar embodiment to that illustrated in FIG. 9A except that in FIG. 9A the RF signal strength is indicated as a continuous boundary rather than a point cloud. As such in FIG. 9B a boundary of an area having a signal strength greater than the first threshold is illustrated in one color 530, and a boundary of an area having a signal strength between the second threshold and the first threshold can be illustrated in the second color 535. As illustrated in FIG. 9B, the boundary of the first threshold 530 is in the shape of a bubble. This acknowledges that the RF propagation from an AP is not uniform at all heights of a floor plan.

Figure 10C:
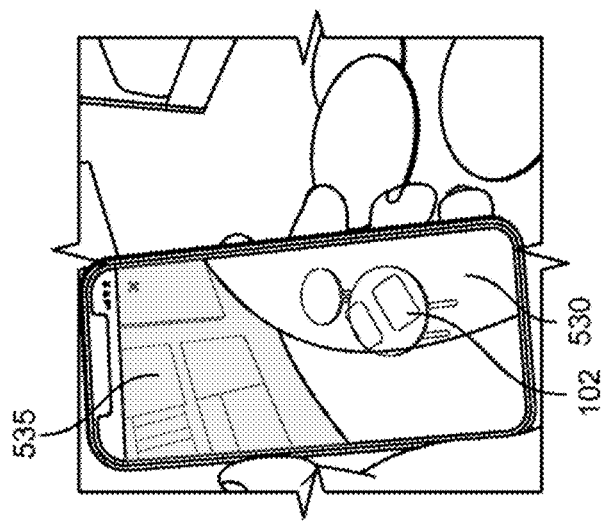
FIGS. 10A, 10B, and 10C illustrate an example augmented reality (AR) embodiment showing an AR visualization as a user moves with a user device in an environment according to some aspects of the disclosed technology.
Figure 10B:
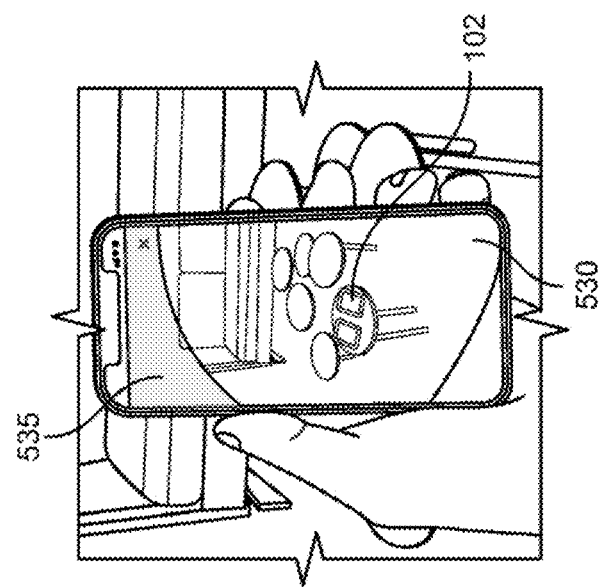
Figure 10A:
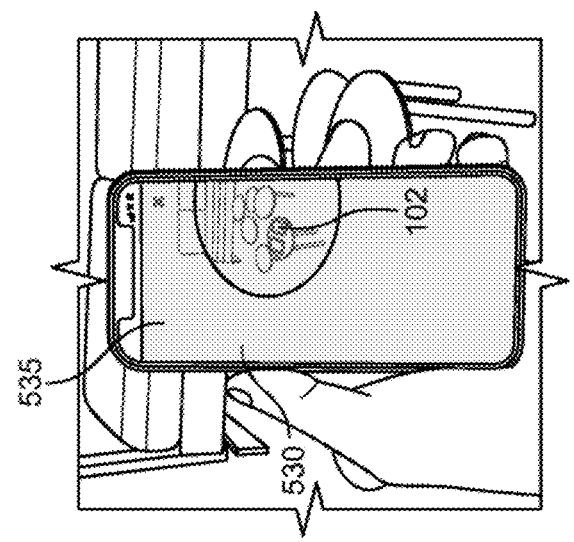

FIG. 10A, FIG. 10B, and FIG. 10C all illustrate a progression of examples of an augmented reality (AR) embodiment. For example, in FIG. 10A, user device 105 has captured an image of a table with an access point sitting on it. Visualization service 108 displays a visualization overlaid the captured image of a color-coded RF propagation pattern wherein a first color boundary 535 can be seen illustrating a boundary of RF propagation equal to a first threshold. Inside the first color boundary 535, a second color boundary illustrating RF propagation at a second threshold can be seen. In FIG. 10B the user has moved closer to access point 102 and has walked within the boundary of the first color 535 such that directly in front of the user is the boundary of the second color 530. Above the user can be seen a portion of the first boundary 535. The user is within a bubble defined by the first boundary 535. FIG. 10C illustrates a further progression of the user's movement within the space where the user has turned to the left to illustrate that they are standing within the first boundary 535 and just outside the second boundary 530.

Figure 11:
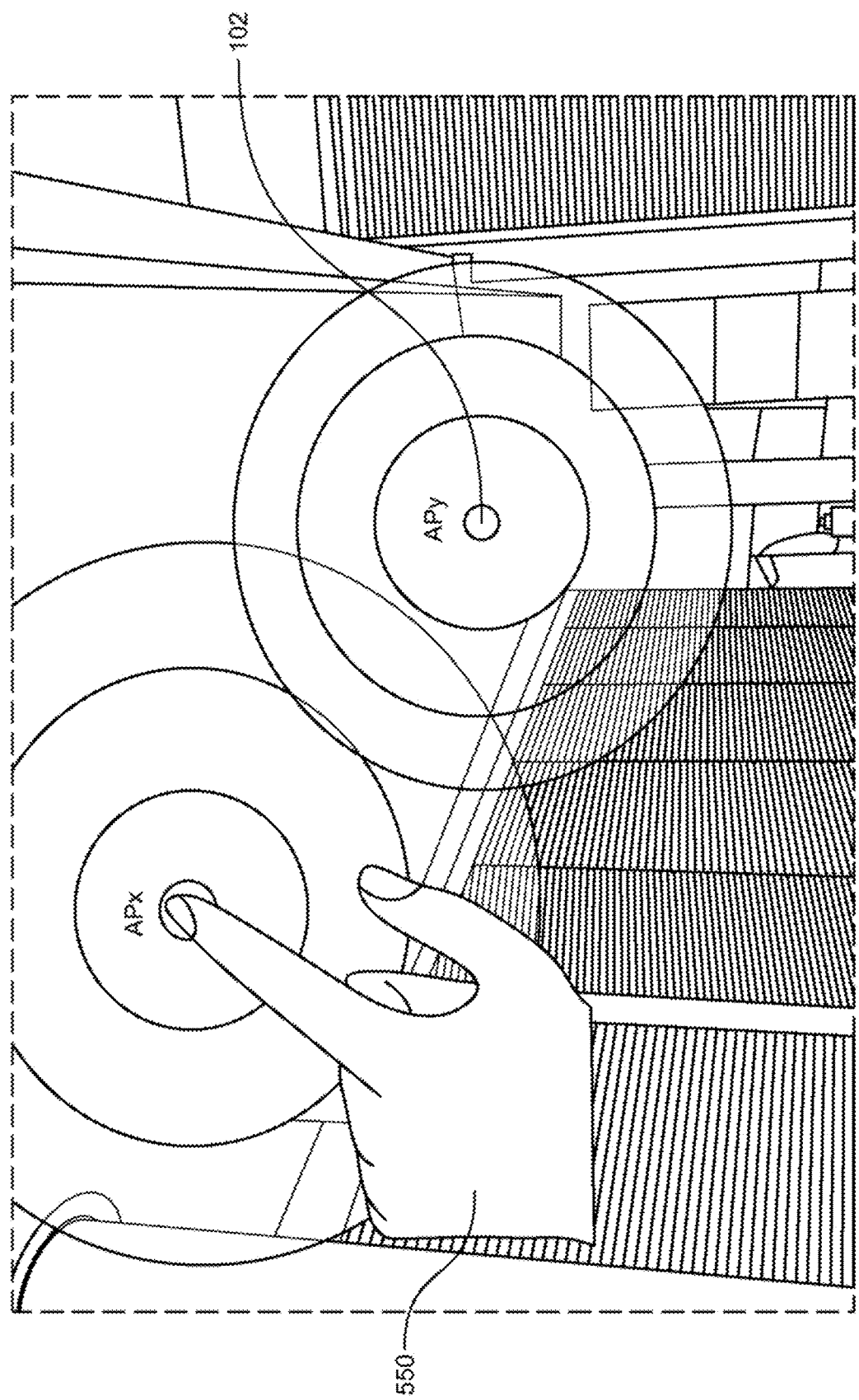
FIG. 11 illustrates an example user interface within an augmented reality (AR) visualization according to some aspects of the disclosed technology.

FIG. 11 illustrates another augmented reality embodiment. In FIG. 11 user device 105 has captured an image of a space including an access point 102 that is displayed by user device 105. Visualization service 108 can display information about RF propagation surrounding the access point in the displayed space. Additionally, user interface service 130 can receive a selection 550 from a user tapping one of the access points displayed by device 105. The selection by the user of the access point in the user interface can result in additional information about the access point being displayed.

Figure 12:
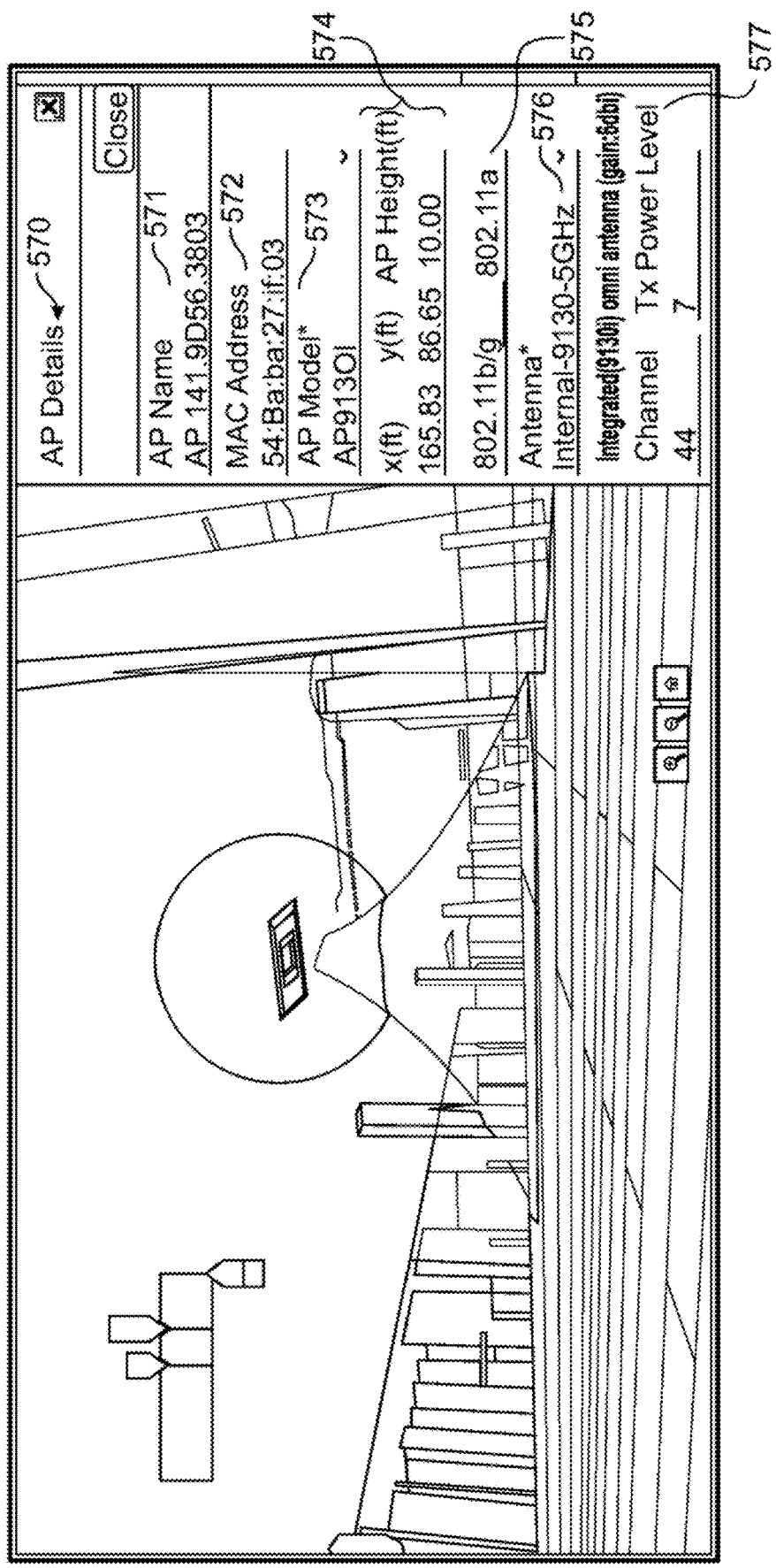
FIG. 12 illustrates an example augmented reality (AR) visualization with an associated menu of options and information according to some aspects of the disclosed technology.

FIG. 12 illustrates an example augmented reality embodiment wherein a menu 570 of details about an access point is displayed. The menu can be displayed as a result of receiving a selection of the access point such as illustrated in FIG. 11. Menu 570 can display information about the access point and can receive user inputs to change some parameters or configurations about the access point.

For example, menu 570 can display information such as access point name 571, MAC address 572 of the access point, model information 573 for the access point, X, Y, and Z grid coordinate location of the access point in the floor plan 574, the wireless protocols which access point is utilizing 575, antenna information 576, channel and transmission power information 577.

Many of these fields are adjustable. For example, access point model 573 can be changed. When the access point model is changed by the user a simulation of in RF propagation pattern for the new selected model can be displayed. Such manipulation can be useful to see how a different piece of equipment might perform. Another useful change by the user can be to change the channel of the access point 577. This can be useful when interference is seen between two access points on the same channel. Changing the channel can remove the interference. When the channel is changed visualization service 108 can display an updated visualization showing the effects of the channel change, and in some embodiments, a user can implement the channel change by pushing it to the access point.

Changing the antenna configuration 576 can be useful to change from a 2 GHz to a 5 GHz antenna or vice-versa to increase range or communication speeds. Additionally, some antennas may provide directional benefits. These changes can be visualized by visualization service 108 in the augmented reality display.

Figure 13:
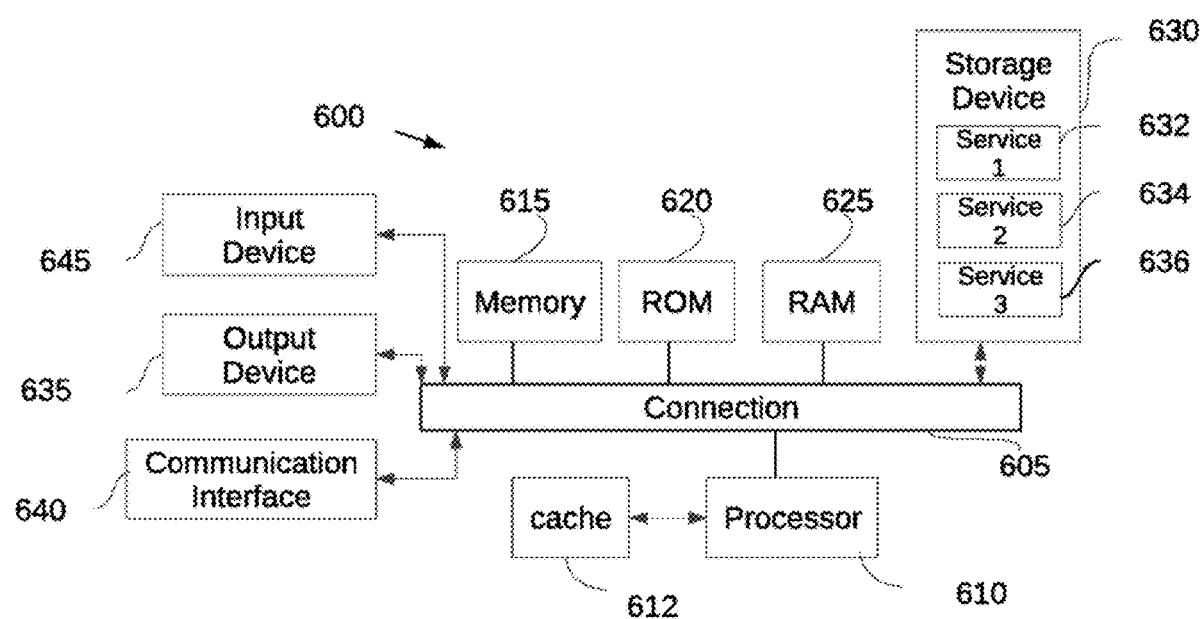
FIG. 13 shows an example of a system for implementing certain aspects of the present technology.

FIG. 13 shows an example of computing system 600, which can be for example any computing device making up visualization system 100, or any component thereof in which the components of the system are in communication with each other using connection 605. Connection 605 can be a physical connection via a bus, or a direct connection into processor 610, such as in a chipset architecture. Connection 605 can also be virtual, networked, or logical.

In some embodiments, computing system 600 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1: A method of visualizing a W-Fi access point 3-D RF propagation pattern in Augmented Reality (AR), the method comprising: calculating the 3-D RF propagation pattern in a space for at least one Wi-Fi access point based on a RF propagation model for the Wi-Fi access point; determining a location and orientation of a user device relative to the at least one Wi-Fi access point in the space; and presenting a visualization of the Wi-Fi access point RF propagation pattern overlaid a first-person perspective view of the space based on the location and the orientation of the user device relative to the at least one Wi-Fi access point.

Aspect 2: The method of Aspect 1, wherein the first-person perspective view of the space is an augmented reality view of the space, the method comprising: capturing at least one image of the space; displaying the at least one image of the space on a display; and presenting the visualization of the Wi-Fi access point RF propagation pattern on the display overlaid the at least one image of the space.

Aspect 3: The method of any of Aspects 1 to 2, wherein the at least one image is a video made up of a plurality of images, the method further comprising: continuously determining the location and orientation of the user device relative to the at least one Wi-Fi access point; and dynamically adjusting the visualization of the Wi-Fi access point RF propagation pattern in coordination with the continuously determining the location and orientation of the user device relative to the at least one Wi-Fi access point.

Aspect 4: The method of any of Aspects 1 to 3, wherein the dynamically adjusting the visualization of the Wi-Fi access point RF propagation pattern in coordination with the continuously determining the location and orientation of the user device relative to the at least one Wi-Fi access point includes: representing the visualization of the Wi-Fi access point propagation in a first style at a first location of the user device, and representing the visualization of the Wi-Fi access point propagation in a second style at a second location of the user device.

Aspect 5: The method of any of Aspects 1 to 4, wherein the calculating the 3-D RF propagation pattern in a space for the at least one Wi-Fi access point based on a RF propagation model for the Wi-Fi access point includes: projecting a plurality of ray-paths in a plurality of directions in a 3-D space, where the ray-paths originate from the Wi-Fi access point and eminent in a variety of X, Y, and Z planes; determining whether the ray-paths interface with a building material defined in a building plan; for each ray-path of the ray-paths that interface with a building material, segmenting the respective ray-path into contiguous segments of substantially uniform mediums; determining a RF signal strength at points along the segments of the ray-paths, wherein the signal degrades along the ray path as defined by the RF propagation model as a function of distance through the segment and characteristics of RF propagation through the substantially uniform mediums through which the segment traverses; 5. The method of any of Aspects 1 to 4, wherein the at least one image of the space includes an object that does not appear in the building plan, and the presenting the visualization of the Wi-Fi access point RF propagation pattern on the display overlaid the at least one image of the space illustrates an aspect of Wi-Fi coverage in the area surrounding the object.

Aspect 6: The method of any of Aspects 1 to 5, wherein the at least one image of the space includes an object that does not appear in the building plan, and the presenting the visualization of the Wi-Fi access point RF propagation pattern on the display overlaid the at least one image of the space illustrates an aspect of Wi-Fi coverage in the area surrounding the object.

Aspect 7: The method of any of Aspects 1 to 6, further comprising: detecting the object that does not appear in the building plan; and labeling the object that does not appear in the building plan when an aspect of the Wi-Fi access point RF propagation pattern surrounding the object is of poor quality as indicated by the aspect of the RF propagation pattern being below a threshold.

Aspect 8: The method of any of Aspects 1 to 7, further comprising: identifying a portion of the building plan in the at least one image of the space; identifying a material that comprises the portion of the building plan; determining that the material that comprises the portion of the building plan is different that the building material recording the building plan for the portion of the building plan; updating the building plan with the identified material, whereby the calculating the 3-D RF propagation pattern is updated using the updated building plan.

Aspect 9: The method of any of Aspects 1 to 8, further comprising: identifying a configuration change in the building plan from the at least one image of the space; updating the building plan with the identified material, whereby the calculating the 3-D RF propagation pattern is updated using the updated building plan.

Aspect 10: The method of any of Aspects 1 to 9, wherein the determining the location and the orientation of the user device relative to the at least one Wi-Fi access point in the space comprises: detecting at least one indicator on the Wi-Fi access point that uniquely identifies the Wi-Fi access point and/or the location of the Wi-Fi access pint.

Aspect 11: The method of any of Aspects 1 to 10, further comprising: after detecting the at least one indicator on the Wi-Fi access point, communicating with a database to learn an identification of the Wi-Fi access point, its location and/or its orientation in the space.

Aspect 12: The method of any of Aspects 1 to 11, wherein the at least one indicator is a QR code, symbols, an optical pattern, a pattern of blinking lights, or the orientation and geometry of a housing of the Wi-Fi access point.

Aspect 13: The method of any of Aspects 1 to 12, wherein the determining the location and the orientation of the user device relative to the at least one Wi-Fi access point in the space comprises: detecting at least one indicator on the Wi-Fi access point that indicates an orientation of the Wi-Fi access point in the space.

Aspect 14: The method of any of Aspects 1 to 13, wherein the at least one indicator on the Wi-Fi access point that indicates an orientation of the Wi-Fi access point is the physical shape of the Wi-Fi access point.

Aspect 15: The method of any of Aspects 1 to 14, wherein the visualization of the Wi-Fi access point RF propagation pattern illustrates at least one attribute of the Wi-Fi propagation pattern, such as signal-to-noise ratio (SNR), signal strength, interference, channel, etc.

Aspect 16: The method of any of Aspects 1 to 15, further comprising: receiving a selection of the Wi-Fi access point in the visualization; after the selection, presenting statistics and information pertaining to the Wi-Fi access point.

Aspect 17: The method of any of Aspects 1 to 16, further comprising: receiving a selection of the Wi-Fi access point in the visualization; after the selection, presenting options pertaining to additional visualizations the Wi-Fi access point RF propagation pattern; and after receiving a selection of an option from the option, presenting a visualization the Wi-Fi access point RF propagation pattern corresponding to the selected option.

Aspect 18: The method of any of Aspects 1 to 17, further comprising: labeling a reference icon indicating a first Wi-Fi access point in the space through which the user device is presently communicating [the first Wi-Fi access point could be different that the at least one access point for which you are viewing the RF propagation pattern].

Aspect 19: The method of any of Aspects 1 to 18, wherein the at least one Wi-Fi access is a plurality of Wi-Fi access points, and the visualization of the Wi-Fi access point RF propagation pattern illustrates RF propagation patterns for the plurality of Wi-Fi access points.

What is claimed is:

1. A method comprising:
   projecting a plurality of ray-paths in a plurality of directions in a 3-dimensional space;
   determining whether the plurality of ray-paths interface with a building material;
   for each ray-path of the plurality of ray-paths that interface with the building material, segmenting the respective ray-path into contiguous segments of substantially uniform mediums; and
   determining radio frequency (RF) signal strengths at points along the contiguous segments.

2. The method of claim 1, where the RF signal strength degrades along the contiguous segments as defined by an RF propagation model as a function of distance through the contiguous segments and characteristics of RF propagation through the substantially uniform mediums.

3. The method of claim 1, wherein the plurality of ray paths originate from one or more access points and emanate in a variety of X, Y and Z planes.

4. The method of claim 1, further comprising:
   receiving information related to the ray-paths that interface with the building material at a virtualization service; and
   determining, at the virtualization service, RF signal strength at particular points along the contiguous segments using the information and an RF propagation model.

5. The method of claim 1, wherein the RF signal strength is visualized in augmented reality.

6. The method of claim 1, further comprising:
   receiving location and orientation information of a user device relative to at least one access point in which one or more ray-paths of the plurality of ray-paths are originated;
   displaying, on a display of the user device, a camera view; and
   overlaying a visualization of the RF signal strength on the camera view utilizing the location and orientation information.

7. The method of claim 6, wherein the visualization of the RF signal strength is dome shaped.

8. A system comprising:
   at least one processor; and
   at least one memory storing instructions, which when executed by the at least one processor, causes the at least one processor to:
      project a plurality of ray-paths in a plurality of directions in a 3-dimensional space;
      determine whether the plurality of ray-paths interface with a building material;
      for each ray-path of the plurality of ray-paths that interface with the building material, segment the respective ray-path into contiguous segments of substantially uniform mediums; and
      determine radio frequency (RF) signal strengths at points along the contiguous segments.

9. The system of claim 8, where the RF signal strength degrades along the contiguous segments as defined by an RF propagation model as a function of distance through the contiguous segments and characteristics of RF propagation through the substantially uniform mediums.

10. The system of claim 8, wherein the plurality of ray paths originate from one or more access points and emanate in a variety of X, Y and Z planes.

11. The system of claim 8, further comprising instructions, which when executed by the at least one processor, causes the at least one processor to:
    receive information related to the ray-paths that interface with the building material at a virtualization service; and
    determine, at the virtualization service, RF signal strength at particular points along the contiguous segments using the information and an RF propagation model.

12. The system of claim 8, wherein the RF signal strength is visualized in augmented reality.

13. The system of claim 8, further comprising instructions, which when executed by the at least one processor, causes the at least one processor to:
    receive location and orientation information of a user device relative to at least one access point in which one or more ray-paths of the plurality of ray-paths are originated;
    display, on a display of the user device, a camera view; and
    overlay a visualization of the RF signal strength on the camera view utilizing the location and orientation information.

14. The system of claim 13, wherein the visualization of the RF signal strength is dome shaped.

15. At least one non-transitory computer-readable medium storing instructions, which when executed by at least one processor, causes the at least one processor to:
    project a plurality of ray-paths in a plurality of directions in a 3-dimensional space;
    determine whether the plurality of ray-paths interface with a building material;
    for each ray-path of the plurality of ray-paths that interface with the building material, segment the respective ray-path into contiguous segments of substantially uniform mediums; and
    determine radio frequency (RF) signal strengths at points along the contiguous segments.

16. The at least one non-transitory computer-readable medium of claim 15, where the RF signal strength degrades along the contiguous segments as defined by an RF propagation model as a function of distance through the contiguous segments and characteristics of RF propagation through the substantially uniform mediums.

17. The at least one non-transitory computer-readable medium of claim 15, wherein the plurality of ray paths originate from one or more access points and emanate in a variety of X, Y and Z planes.

18. The at least one non-transitory computer-readable medium of claim 15, further comprising instructions, which when executed by the at least one processor, causes the at least one processor to:
    receive information related to the ray-paths that interface with the building material at a virtualization service; and
    determine, at the virtualization service, RF signal strength at particular points along the contiguous segments using the information and an RF propagation model.

19. The at least one non-transitory computer-readable medium of claim 15, wherein the RF signal strength is visualized in augmented reality.

20. The at least one non-transitory computer-readable medium of claim 15, further comprising instructions, which when executed by the at least one processor, causes the at least one processor to:
- receive location and orientation information of a user device relative to at least one access point in which one or more ray-paths of the plurality of ray-paths are originated;
- display, on a display of the user device, a camera view; and
- overlay a visualization of the RF signal strength on the camera view utilizing the location and orientation information.

* * * * *